(12) United States Patent
Muraguchi et al.

(10) Patent No.: US 8,748,001 B2
(45) Date of Patent: Jun. 10, 2014

(54) SUBSTRATE WITH HARD COAT FILM AND COATING SOLUTION FOR FORMING HARD COAT FILM COMPRISING CORE-SHELL COMPOSITE OXIDE SURFACE-TREATED WITH AN ORGANIC SILICON COMPOUND

(75) Inventors: Ryo Muraguchi, Kitakyushu (JP);
Mitsuaki Kumazawa, Kitakyushu (JP);
Wataru Futagami, Kitakyushu (JP);
Yuji Tawarazako, Kitakyushu (JP);
Masayuki Matsuda, Kitakyushu (JP);
Toshiharu Hirai, Kitakyushu (JP)

(73) Assignee: JGC Catalysts and Chemicals Ltd. (JP)

( * ) Notice: Subject to any disclaimer, the term of this patent is extended or adjusted under 35 U.S.C. 154(b) by 741 days.

(21) Appl. No.: 12/201,172

(22) Filed: Aug. 29, 2008

(65) Prior Publication Data
US 2009/0061183 A1 Mar. 5, 2009

(30) Foreign Application Priority Data

Aug. 31, 2007 (JP) .................................. 2007-225475
Oct. 29, 2007 (JP) .................................. 2007-280565

(51) Int. Cl.
*B32B 27/20* (2006.01)
*B32B 19/00* (2006.01)
*B32B 19/04* (2006.01)
*C08K 5/5415* (2006.01)
*C08K 5/5419* (2006.01)
*C09D 7/12* (2006.01)
*C09C 1/00* (2006.01)
*C09C 1/30* (2006.01)
*C09C 3/08* (2006.01)

(52) U.S. Cl.
CPC ............ C08K 5/5415 (2013.01); C08K 5/5419 (2013.01); *C08K 2201/005* (2013.01); *C09C 1/0096* (2013.01); *C09C 1/3081* (2013.01); *C09C 3/08* (2013.01); C09D 7/1225 (2013.01); C09D 7/1258 (2013.01)
USPC ........... 428/403; 428/328; 428/331; 428/332; 428/405; 428/570; 428/632; 428/663; 428/701

(58) Field of Classification Search
CPC ............... C08K 5/5415; C08K 5/5419; C08K 2003/22; C08K 2003/2279; C08K 2201/005; C09C 1/0096; C09C 1/3081; C09C 3/08; C09D 7/1225; C09D 7/1258
USPC ......... 428/403–407, 570, 632, 663, 328, 331, 428/332, 701
See application file for complete search history.

(56) References Cited

U.S. PATENT DOCUMENTS

| | | | | |
|---|---|---|---|---|
| 3,860,523 A * | 1/1975 | Petrow et al. | .................. | 252/608 |
| 5,165,992 A * | 11/1992 | Yajima | .......................... | 428/328 |
| 5,366,545 A * | 11/1994 | Yajima et al. | .............. | 106/286.4 |
| 5,750,258 A * | 5/1998 | Sakai et al. | ..................... | 428/405 |
| 5,785,892 A * | 7/1998 | Nishida et al. | ................... | 516/31 |
| 6,180,030 B1 * | 1/2001 | Hirai et al. | ..................... | 252/512 |
| 6,620,508 B2 * | 9/2003 | Inoue et al. | ..................... | 428/403 |
| 6,626,987 B1 * | 9/2003 | Suzuki et al. | ............. | 106/287.14 |
| 7,037,583 B2 * | 5/2006 | Furman et al. | ................. | 428/403 |
| 7,208,229 B2 * | 4/2007 | Suzuki et al. | .................. | 428/447 |
| 7,323,122 B2 * | 1/2008 | Muraguchi et al. | ......... | 252/521.3 |
| 7,556,682 B2 | 7/2009 | Koyama et al. | | |
| 8,029,899 B2 * | 10/2011 | Vijverberg et al. | ............ | 428/405 |
| 2004/0086724 A1 * | 5/2004 | Suzuki et al. | .................. | 428/446 |
| 2008/0276835 A1 * | 11/2008 | Koyama et al. | ............. | 106/286.4 |
| 2009/0029153 A1 | 1/2009 | Naito et al. | | |

FOREIGN PATENT DOCUMENTS

| | | |
|---|---|---|
| JP | 8048940 A | 2/1996 |
| JP | 2001122621 A | 5/2001 |
| JP | 2001123115 A | 5/2001 |
| JP | 2002363442 A | 12/2002 |
| JP | 2004300210 A | 10/2004 |
| JP | 2006010799 A | 1/2006 |
| JP | 2006143535 A | 6/2006 |
| JP | 2006146131 A | 6/2006 |
| WO | 2007018176 A1 | 2/2007 |

OTHER PUBLICATIONS

Zeta Potential instruments, Inc. downloaded Jan. 20, 2012.*
The Effect of Dispersant on Colloidal Stability and Zeta Potential by Brookhaven Instruments, Jul. 2010.*
Online machine translation of JP 2006-010799 (Jan. 2006).*

* cited by examiner

*Primary Examiner* — Holly Le
(74) *Attorney, Agent, or Firm* — The Webb Law Firm

(57) ABSTRACT

Modified zirconia fine particles which are stable in an acidic region as well as in an alkaline region, and which may be readily adjusted in refractive index in a predetermined range are disclosed. Also disclosed is a substrate with a hard coat film excellent in adhesiveness with the substrate, abrasion resistance, scratch strength, pencil hardness and the like without interference fringes and a coating solution which may form the hard coat film. The substrate with a hard coat film is composed of composite oxide particles formed on at least one surface of the substrate and a matrix component, wherein the composite oxide particles are composite oxide particles having a core-shell structure composed of a core formed from zirconium oxide and a shell formed from antimony pentoxide and/or silica.

4 Claims, No Drawings

SUBSTRATE WITH HARD COAT FILM AND COATING SOLUTION FOR FORMING HARD COAT FILM COMPRISING CORE-SHELL COMPOSITE OXIDE SURFACE-TREATED WITH AN ORGANIC SILICON COMPOUND

BACKGROUND OF THE INVENTION

1. Field of the Invention

The present invention relates to zirconia fine particles, which are excellent in dispersibility and stability over a wide range of pH of a dispersion solution because the surface is coated with antimony pentoxide or silica, a dispersion sol of the fine particles and a method for producing the same. In addition, the present invention relates to a substrate with a hard coat film comprised with a substrate and a hard coat film formed on the substrate and excellent in adhesiveness with the substrate, abrasion resistance, scratch strength, pencil hardness and the like, in which the refractive indices of the substrate and a transparent film may be adjusted to the same degree and thus no interference fringes occurs, because the substrate with the hardcoat film may be readily adjusted in refractive index in a predetermined range and contains composite oxide particles excellent in dispersibility and stability, and a coating solution used for forming the hard coat film.

2. Description of the Related Art

In order to improve abrasion resistance on the surface of a substrate such as glass, a plastic sheet, a plastic lens, a resin film, a display front panel and the like, it is known that a hard coat film is formed on the surface of the substrate and it has been conducted that an organic resin film or an inorganic film is formed on the surface of glass, plastics and the like as such a hard coat film. In addition, it has been conducted that resin particles or inorganic particles such as silica and the like are blended in the organic resin film or inorganic film to further increase abrasion resistance.

For example, there is known a hard coat film blended therein with inorganic oxide particles such as silica particles, zirconia, ITO, ATO, antimony pentoxide particles and the like, mixed particles thereof, chain particles thereof or the like.

In addition, colloidal particles such as silica, alumina, titania, zirconia, zinc oxide, antimony pentoxide, cerium oxide, tin oxide, silica-alumina, silica-zirconia and the like are used as an optical material by blending the particles with a film and the like to adjust a refractive index. For example, silica is used as a low refractive index material, alumina as a middle refractive index material and titania, zirconia and the like as a high refractive index material.

Although titania particles have a high refractive index, they had a problem with dispersion resistance, as well as light resistance, weather resistance and the like due to the photocatalytic activity depending on the usage and application. For this reason, it has been conducted that dispersion stability as well as light resistance, weather resistance and the like are improved by forming a composite component of other components, for example, a silica component and the like. However, in addition to the fact that some of composite components reduce refractive index, it is difficult to completely suppress the photocatalytic activity, and thus there was a case where light resistance, weather resistance and the like became insufficient (Patent Document 1: refer to Japanese Patent Laid-Open Publication No. H08-48940).

On the other hand, although zirconia particles have substantially no photocatalytic activity and are excellent in light resistance, weather resistance and the like, it was difficult to obtain a zirconia sol in the colloidal range having a uniform particle size distribution and excellent in stability.

Consequently, the applicant of this application has disclosed that a zirconia sol having a uniform particle size distribution and excellent in stability is obtained by preparing a zirconia gel in the presence of a particle growth regulator and performing the hydrothermal treatment (Patent Document 2: refer to Japanese Patent Laid-Open Publication No. 2006-143535).

SUMMARY OF THE INVENTION

However, when the difference between the refractive index of a substrate and the refractive index of a hard coat film is extremely small, no interference fringes occur. In order to maintain the difference in refractive index, there was a restraint on the kinds and refractive index of a substrate, the kinds and refractive index of a matrix of a hard coat film, and further the selection of particles. In addition, when the refractive index is adjusted by blending particles, if the particle sizes are significantly different and the surface characteristics (the surface potential, the affinity with a matrix component, and the like) of particles are different, the particles were agglomerated each other, the dispersibility to the matrix component was reduced and the abrasion resistance was insufficient in some cases. Further, since silica per se is not insufficient in alkali resistance, if silica is treated with alkali to provide an adhesive layer, there were problems that the silica was discolored, the transparency was lowered, and the like.

In addition, although being different depending on the pH of a coating solution for forming a hard coat film, in general, in the case of the fine particles such as zirconia fine particles, tin-doped indium oxide (ITO) and the like, the particle surface is positively charged in a dispersion solution, and in the case of the particles such as silica fine particles, titania fine particles, antimony pentoxide fine particles, zinc oxide fine particles, alumina fine particles, silica-alumina fine particles, antimony-doped tin oxide fine particles (ATO), zinc-doped alumina (AZO) and the like, the particle surface is negatively charged in a dispersion solution. If the former and the latter are mixed, there was a problem that they counteract the mutual potential and are agglomerated each other, in some cases resulting in insufficient for adhesiveness with a substrate, abrasion resistance, production reliability and the like. Further, in such a case, it is known that dispersion is promoted by adding a nonionic surfactant. However, although the dispersibility is improved, the resulting hard coat film still has insufficient adhesiveness with a substrate, abrasion resistance and the like, and thus further improvement has been demanded.

Consequently, the present inventors studied the use of zirconia particles in a hard coat film, but a dispersion solution of zirconia particles or a coating solution using zirconia particles which is conventionally known had a problem with stability because they are easily gelled in an acidic region.

Under these circumstances, the present inventors have earnestly studied to solve the problems. As a result, they have found that zirconia fine particles having a good stability in an extensive pH range are obtained by coating zirconia particles with antimony pentoxide or silica-based composite oxides and thus have completed the present invention. Further, the present inventors have found that composite oxide particles which are the modified zirconia fine particles are easily adjusted in refractive index and have excellent dispersion stability without agglomerating, and thus have completed the present invention.

The composition of the present invention is as follows:

[1] Modified zirconia fine particles characterized by the zirconia fine particles having their surfaces coated with antimony pentoxide and/or silica, and having their surface potentials in a range of −120 to −10 mV, as measured by the following conditions.

The condition (1): a solid content concentration of 1% by weight in a dispersion solution of the modified zirconia fine particles.

The conditions (2): a pH in a range of 2 to 13 in a dispersion solution of the modified zirconia fine particles.

[2] In addition, the modified zirconia fine particles according to [1], wherein they are surface-treated with an organic silicon compound represented by the following formula (1).

$$R_n\text{—}SiX_{4-n} \qquad (1)$$

(Provided that in the formula (1), R represents an unsubstituted or substituted hydrocarbon group having 1 to 10 carbon atoms and may be the same or different from each other, X represents an alkoxy group having 1 to 4 carbon atoms, a hydroxyl group, a halogen atom, a hydrogen atom, and n is an integer of 1 to 3.)

[3] The modified zirconia fine particles according to [1] or [2], wherein an average particle size is in a range of 5 to 120 nm.

[4] The modified zirconia fine particles according to any of [1] to [3], wherein a refractive index is in a range of 1.5 to 2.1.

[5] A dispersion sol of modified zirconia fine particles characterized in that the modified zirconia fine particles according to any of [1] to [4] are dispersed in water and/or an organic solvent and have a solid content concentration in a range of 1 to 50% by weight.

[6] A method for producing modified zirconia fine particles, characterized by performing the following steps (a) to (c):
(a) a step of preparing a dispersion solution in which there are mixed an aqueous dispersion solution (A) of zirconia fine particles having a concentration of 0.1 to 20% by weight in terms of $ZrO_2$ and an alkali antimonate aqueous solution (B) having a concentration of 0.1 to 20% by weight in terms of $Sb_2O_5$ or an alkali silicate aqueous solution or a tetrafunctional alkoxy silane solution (C) having a concentration of 0.1 to 20% by weight in terms of $SiO_2$;
(b) a step of bringing the mixed dispersion solution into contact with a cation-exchange resin; and
(c) a step of aging at 40 to 200° C.

[7] The method for producing modified zirconia fine particles according to [6], wherein in the step (a), the mixing ratio of the aqueous dispersion solution (A) of zirconia fine particles to the alkali antimonate aqueous solution (B) or the alkali silicate aqueous solution or the tetrafunctional alkoxy silane solution (C) is in a range of 0.01 to 2.3 in terms of the oxide weight ratio $Sb_2O_5/ZrO_2$ or $SiO_2/ZrO_2$.

[8] The method for producing modified zirconia fine particles according to [6] or [7], characterized by performing the following steps (d) to (g) following the step (c):
(d) a step of replacing the aqueous dispersion solution of the modified zirconia fine particles obtained in step (c) by an organic solvent;
(e) a step of adding an aqueous solution and/or an organic solvent solution of an organic silicon compound represented by the following formula (2):

$$R_n\text{—}SiX_{4-n} \qquad (2)$$

(Provided that in the formula (2), R represents an unsubstituted or substituted hydrocarbon group having 1 to 10 carbon atoms and may be the same or different from each other, X represents an alkoxy group having 1 to 4 carbon atoms, a hydroxyl group, a halogen atom, a hydrogen atom, and n is an integer of 1 to 3);
(f) a step of surface-treating the modified zirconia fine particles by the hydrolyzation of the organic silicon compound by adding a hydrolysis catalyst if necessary; and
(g) a step of aging at 30 to 120° C.

[9] The method for producing modified zirconia fine particles according to any of [6] to [8], wherein an average particle size is in a range of 5 to 120 nm.

[10] The method for producing modified zirconia fine particles according to any of [6] to [9], wherein a refractive index is in a range of 1.5 to 2.1.

[11] A substrate with a hard coat film composed of a substrate; and a hard coat film composed of composite oxide particles and a matrix component formed at least one surface of the substrate, the composite oxide particles are composite oxide particles having a core-shell structure composed of a core formed from zirconium oxide and a shell formed from antimony pentoxide and/or silica, and the difference between the refractive index ($HC_n$) of the hardcoat film and the refractive index ($S_n$) of the substrate is 0.3 or less.

[12] The substrate with a hard coat film according to [11], wherein the composite oxide particles are modified zirconia fine particles having their surfaces coated with antimony pentoxide and/or silica and having their surface potentials in a range of −120 to −10 mV, as measured by the following conditions.

The condition (1): a solid content concentration of 1% by weight in a dispersion solution of the modified zirconia fine particles.

The conditions (2): a pH in a range of 2 to 13 in a dispersion solution of the modified zirconia fine particles.

[13] The substrate with a hard coat film according to [11] or [12], wherein the composite oxide particles have an average particle size in a range of 5 to 120 nm and a refractive index ($P_n$) in a range of 1.50 to 2.10.

[14] The substrate with a hard coat film according to any of [11] to [13], wherein the outermost layer of the composite oxide particles is antimony pentoxide.

[15] The substrate with a hard coat film according to any of [11] to [14], wherein the composite oxide particles are surface-treated with an organic silicon compound represented by the following formula (1).

$$R_n\text{—}SiX_{4-n} \qquad (1)$$

(Provided that in the formula (1), R represents an unsubstituted or substituted hydrocarbon group having 1 to 10 carbon atoms and may be the same or different from each other, X represents an alkoxy group having 1 to 4 carbon atoms, a hydroxyl group, a halogen atom, a hydrogen atom, and n is an integer of 1 to 3.)

[16] The substrate with a hard coat film according to [15], wherein the organic silicon compound is an organic silicon compound represented by the following formula (1-1) or an organic silicon compound represented by the following formula (1-2).

$$R^1(X')_m\text{—}Si(OR^2)_3 \qquad (1-1)$$

(In the formula (1-1), $R^1$ represents a organic group having 1 to 10 carbon atoms derived from a substituted or unsubstituted hydrocarbon, X' represents one or more kinds of functional groups selected from a (meth)acryloyl group, an epoxy group (a glycide group), an urethane group, an amino group and a fluoro group, and m is an integer of 1 or more, and $R^2$ represents a organic group having 1 to 10 carbon atoms derived from a substituted or unsubstituted hydrocarbon.)

$$Si(OR^3)_4 \quad (1\text{-}2)$$

(In the formula (1-2), $R^3$ represents a hydrogen atom, a halogen atom, a organic group having 1 to 10 carbon atoms derived from a substituted or unsubstituted hydrocarbon group.)

[17] The substrate with a hard coat film according to any of [11] to [16], wherein the matrix component is composed of a silicon resin and/or an organic resin.

[18] The substrate with a hard coat film according to any of [11] to [17], wherein the hard coat film has a surface resistance value of $10^8$ to $10^{14}$ Ω/sq.

[19] The substrate with a hard coat film according to [15], wherein the composite oxide particles are obtained from the following steps (a) to (c):

(a) a step of preparing a dispersion solution in which there are mixed an aqueous dispersion solution (A) of zirconia fine particles having a concentration of 0.1 to 20% by weight in terms of $ZrO_2$ and an alkali antimonate aqueous solution (B) having a concentration of 0.1 to 20% by weight in terms of $Sb_2O_5$ or an alkali silicate aqueous solution or a tetrafunctional alkoxy silane solution (C) having a concentration of 0.1 to 20% by weight in terms of $SiO_2$;

(b) a step of bringing the mixed dispersion solution into contact with a cation-exchange resin; and (c) a step of aging at 40 to 200° C.

[20] The substrate with a hard coat film according to [19], wherein in the step (a), the mixing ratio of the aqueous dispersion solution (A) of zirconia fine particles to the alkali antimonate aqueous solution (B) or the alkali silicate aqueous solution or the tetrafunctional alkoxy silane solution (C) is in a range of 0.01 to 2.3 in terms of the oxide weight ratio $Sb_2O_5/ZrO_2$ or $SiO_2/ZrO_2$.

[21] The substrate with a hard coat film according to [19], wherein, following the step (c), the modified zirconia fine particles are obtained by performing the following steps:

(d) a step of replacing the aqueous dispersion solution of the modified zirconia fine particles obtained in step (c) by an organic solvent;

(e) a step of adding an aqueous solution and/or an organic solvent solution of an organic silicon compound represented by the following formula (1):

$$R_n\text{—}SiX_{4-n} \quad (1)$$

(provided that in the formula (1), R represents an unsubstituted or substituted hydrocarbon group having 1 to 10 carbon atoms and may be the same or different from each other, X represents an alkoxy group having 1 to 4 carbon atoms, a hydroxyl group, a halogen atom, a hydrogen atom, and n is an integer of 1 to 3);

(f) a step of surface-treating the modified zirconia fine particles by the hydrolyzation of the organic silicon compound by adding a hydrolysis catalyst if necessary; and (g) a step of aging at 30 to 120° C.

[22] A coating solution for forming a hard coat film composed of composite oxide particles and a matrix-forming component, wherein the composite oxide particles are composite oxide particles having a core-shell structure composed of a core formed from zirconium oxide and a shell formed from antimony pentoxide and/or silica.

[23] The coating solution for forming a hard coat film according to [22], wherein the composite oxide particles have an average particle size in a range of 5 to 120 nm and a refractive index ($P_n$) in a range of 1.50 to 2.10.

[24] The coating solution for forming a hard coat film according to [12] or [23], wherein the outermost layer of the composite oxide particles is antimony pentoxide.

[25] The coating solution for forming a hard coat film according to any of [22] to [24], wherein the composite oxide particles are modified zirconia fine particles having their surfaces coated with antimony pentoxide and/or silica and having their surface potentials in a range of −120 to −10 mV, as measured by the following conditions.

The condition (1): a solid content concentration of 1% by weight in a dispersion solution of the modified zirconia fine particles.

The conditions (2): a pH in a range of 2 to 13 in a dispersion solution of the modified zirconia fine particles.

[26] The coating solution for forming a hard coat film according to any of [22] to [25], wherein the composite oxide particles are surface-treated with an organic silicon compound represented by the following formula (1).

$$R_n\text{—}SiX_{4-n} \quad (1)$$

(Provided that in the formula (1), R represents an unsubstituted or substituted hydrocarbon group having 1 to 10 carbon atoms and may be the same or different from each other, X represents an alkoxy group having 1 to 4 carbon atoms, a hydroxyl group, a halogen atom, a hydrogen atom, and n is an integer of 1 to 3.)

[27] The coating solution for forming a hard coat film according to [26], wherein the organic silicon compound is an organic silicon compound represented by the following formula (1-1) or an organic silicon compound represented by the following formula (1-2).

$$R^1(X')_m\text{—}Si(OR^2)_3 \quad (1\text{-}1)$$

(In the formula (1-1), $R^1$ represents a organic group having 1 to 10 carbon atoms derived from a substituted or unsubstituted hydrocarbon, X' represents one or more kinds of functional groups selected from a (meth)acryloyl group, an epoxy group (a glycide group), an urethane group, an amino group and a fluoro group, m is an integer of 1 or more, and $R^2$ represents a organic group having 1 to 10 carbon atoms derived from a substituted or unsubstituted hydrocarbon.

$$Si(OR^3)_4 \quad (1\text{-}2)$$

(In the formula (1-2), $R^3$ represents a hydrogen atom, a halogen atom, a organic group having 1 to 10 carbon atoms derived from a substituted or unsubstituted hydrocarbon group.

[28] The coating solution for forming a hard coat film according to any of [22] to [27], wherein the matrix component is composed of a silicon resin and/or an organic resin.

The present invention may provide modified zirconia fine particles in which the surface of zirconia fine particles is coated with antimony pentoxide or silica and which are stable even in an acidic region as well as in an alkaline region, a dispersion sol of the fine particles, and a method for producing the same.

Since the modified zirconia fine particles of the present invention have a high refractive index, may be adjusted in refractive index and are excellent in dispersibility and stability, they are suitably used in a transparent coating film having a high refractive index. Specifically, there may be obtained a transparent coating film excellent in adhesiveness with a substrate, abrasion resistance, scratch strength, pencil hardness, haze and the like, in which the refractive indices of the substrate and the transparent film may be adjusted to the same degree and thus no interference fringes occurs.

The present invention may provide a substrate with a hard coat film excellent in adhesiveness with a substrate, abrasion resistance, film hardness, haze and the like, in which the refractive indices of the substrate and the hard coat film may be approximated and thus no interference fringes occurs because the hard coat film provided on the substrate surface contains composite oxide particles having a core-shell structure composed of a core formed from zirconium oxide which may be adjusted in refractive index and is excellent in dispersibility and a shell formed from antimony pentoxide and/or silica, and a coating material for forming the hard coat film.

BEST MODE FOR CARRYING OUT THE INVENTION

Hereinafter, at first, there will be explained the modified zirconia fine particles and the substrate with a hard coat film according to the present invention.
[Modified Zirconia Fine Particles]
Hereinafter, at first, there will be explained the modified zirconia fine particles according to the present invention.

The modified zirconia fine particles according to the present invention are zirconia fine particles having their surfaces coated with antimony pentoxide and/or silica, and having their surface potentials in a range of −120 to −10 mV, as measured by the following conditions:

The condition (1): a solid content concentration of 1% by weight in a dispersion solution of the modified zirconia fine particles.

The conditions (2): a pH in a range of 2 to 13 in a dispersion solution of the modified zirconia fine particles.

Note that, in the present invention, the surface potential is hereinafter referred to as a zeta potential.
Zirconia Fine Particles The zirconia fine particles (zirconia core fine particles) constituting the modified zirconia fine particles of the present invention have an average particle size of preferably approximately 3 to 100 nm and more preferably 5 to 80 nm.

If the zirconia core fine particles have an average particle size of less than 3 nm, they are difficult to obtain. Even if they are obtained, they have insufficient crystallinity, have a lower refractive index compared to zirconia fine particles having high crystallinity, have low dispersion stability and may be agglomerated, therefore, making it difficult to form a coating layer by antimony pentoxide and/or silica, which is described later.

If the zirconia core particles have an average particle size exceeding 100 nm, the resulting modified zirconia fine particles may have an average particle size exceeding 120 nm and the light scattering becomes strong, and thus the transparency of the transparent film using the particles may be insufficient and the haze may be increased.

As the zirconia fine particles, there may be preferably used the zirconia sol which was disclosed in Japanese Patent Laid-Open Publication No. 2006-143535 filed by the present applicants, in which the zirconia fine particles have an average particle size in a range of 5 to 100 nm, have a uniform particle size distribution, and have high crystallinity and an high refractive index.

The average particle size may be determined by measuring the size of 50 particles in transmission electron microscopy (TEM) images and then averaging the size.
Antimony Pentoxide and/or Silica Coating Layers A coating layer (hereinafter simply may be referred to as the shell) composed of antimony pentoxide and/or silica is formed on the core particle surface. The content of the antimony pentoxide and/or silica coating layers in the modified zirconia fine particles is preferably 1 to 70% by weight and more preferably 3 to 50% by weight in terms of the oxide.

If the content of the antimony pentoxide or silica coating layers in the modified zirconia fine particles is less than 1% by weight in terms of the oxide, the coating layer is thin and the surface is not sufficiently negatively charged in the similar manner to that of the antimony oxide colloid particles or silica colloid particles, that is, colloidal characteristics similar to those of antimony oxide or silica are not obtained, the dispersibility and the dispersion stability become insufficient, and the modified zirconia fine particles may be agglomerated when they are mixed with other particles or a binder.

If the content of the antimony pentoxide or silica coating layers in the modified zirconia fine particles exceeds 70% by weight in terms of the oxide, the ratio of zirconia, which is a core particle, is extremely low, the resulting particles have a low refractive index and the modified zirconia fine particles having a desired refractive index may not be obtained.

As an embodiment of the present invention, there may be mentioned, in addition to a two-layer structure of a zirconia core-antimony pentoxide shell, a zirconia core-silica shell and a zirconia core-silica/antimony pentoxide composite oxide shell, a zirconia core-silica intermediate layer-antimony pentoxide outermost layer, a zirconia core-antimony pentoxide intermediate layer-silica outermost layer, a zirconia core-antimony pentoxide first layer-silica second layer-antimony pentoxide outermost layer and further a zirconia core-antimony pentoxide/silica composite oxide intermediate layer-antimony pentoxide outermost layer and the like.
Modified Zirconia Fine Particles The modified zirconia fine particles of the present invention have an average particle size of preferably 5 to 120 nm and more preferably 10 to 100 nm.

It is difficult to obtain modified zirconia fine particles having an average particles size of less than 5 nm, and even if they are obtained, they may insufficiently have dispersibility, stability and the like.

If the modified zirconia fine particles have an average particle size exceeding 120 nm, the haze of a transparent coating film using the modified zirconia fine particles tends to be deteriorated.

In addition, the modified zirconia fine particles of the present invention have a refractive index of preferably 1.5 to 2.1 and more preferably 1.8 to 2.1.

If the modified zirconia fine particles have a refractive index of less than 1.5, other particles having a low refractive index, for example, particles mainly formed from silica may be used instead of using the modified zirconia fine particles of the present invention. It is difficult to obtain the modified zirconia fine particles having a refractive index exceeding 2.1 as particles coated with antimony pentoxide and silica in the composition range described above.

The refractive index of the modified zirconia fine particles of the present invention may be measured by a standard solution method for refractive index. Note that, in the present invention, zirconia has a refractive index of 2.15, antimony pentoxide has that of 1.68 and silica has that of 1.43.

In the modified zirconia fine particles according to the present invention, when the solid content concentration is adjusted to 1% by weight, a dispersion solution of the modified zirconium fine particles has a pH of preferably 2 to 13, and a surface potential of preferably −120 to −10 mV and more preferably −120 to −20 mV.

It is difficult to obtain modified zirconia fine particles having a surface potential of less than −120 mV. If the modified zirconia fine particles have a surface potential exceeding −10 mV, the electrostatic repulsion between the modified zirconia fine particles is weak and the stability may become insufficient. If they are used in a transparent coating film, the haze is increased and the transparent coating film is whitened in some cases.

Surface Treatment

Further, the modified zirconia fine particles of the present invention are preferably surface-treated with an organic silicon compound represented by the following formula (1).

$$R_n\text{—}SiX_{4-n} \quad (1)$$

(Provided that in the formula (1), R represents an unsubstituted or substituted hydrocarbon group having 1 to 10 carbon atoms and may be the same or different from each other. X represents an alkoxy group having 1 to 4 carbon atoms, a hydroxyl group, a halogen atom, a hydrogen atom, and n is an integer of 1 to 3.)

Such an organic silicon compound includes methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltrimethoxysilane, γ-glycidoxypropyltriethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltriethoxysilane, butyltrimethoxysilane, isobutyltriethoxysilane, hexyltriethoxysilane, octyltriethoxysilane, decyltriethoxysilane, butyltriethoxysilane, isobutyltriethoxysilane, hexyltriethoxysilane, octyltriethoxysilane, decyltriethoxysilane, 3-ureido-isopropylpropyltriethoxysilane, perfluorooctylethyltrimethoxysilane, perfluorooctylethyltriethoxysilane, perfluorooctylethyltriisopropoxysilane, trifluoropropyltrimethoxysilane, γ-mercaptopropyl trimethoxy silane, trimethylsilanol, methyltrichlorosilane and the like, and a mixture thereof.

The treating amount of the organic silicon compound at this time is preferably 1 to 50% by weight, more preferably 2 to 30% by weight, provided that the organic silicon compound in the modified zirconia fine particles is $R_n\text{—}SiO_{(4-n)/2}$.

If the treating amount of the organic silicon compound is less than 1% by weight in terms of $R_n\text{—}SiO_{(4-n)/2}$, the surface treatment is insufficient and the improvement effect of dispersion stability may not be sufficiently obtained.

If the treating amount of the organic silicon compound exceeds 50% by weight in terms of $R_n\text{—}SiO_{(4-n)/2}$, the improvement effect of dispersion stability is obtained. However, the refractive index of the resulting modified zirconia fine particles may be lowered outside the above range, and when used in a transparent coating film, the refractive index difference with a substrate may become 0.3 or higher depending on the refractive index of the substrate and optical interference (interference fringes) may occur.

The surface treatment of the modified zirconia fine particles may be performed by a conventionally known method. The surface treatment may be conducted by hydrolyzing the organic silicon compound, for example, by adding a predetermined amount of the organic silicon compound to an alcohol dispersion solution of the modified zirconia fine particles, and adding water to the resulting mixture, and then adding acid or alkali as a catalyst for hydrolysis of the organic silicon compound if needed.

A conventionally known method may be used for the surface treatment of the composite oxide particles. The organic silicon compound is hydrolyzed by adding a predetermined amount of the organic silicon compound to an alcohol dispersion solution of the composite oxide particles, and adding water to the resulting mixture, and then adding acid or alkali as a catalyst for hydrolysis of the organic silicon compound if needed.

There are three types of embodiments of the modified zirconia fine particles according to the present invention. The production method is not particularly limited as long as particles in which zirconium oxide is coated with antimony pentoxide and/or silica, are obtained, but the modified zirconia fine particles may be produced, for example, by the following methods.

(1) Modified Zirconia Fine Particles Coated with Antimony Pentoxide

The modified zirconia fine particles may be obtained by mixing a dispersion solution of zirconium oxide particles having an average particle size of approximately 3 to 100 nm with an aqueous solution of sodium antimonate, potassium antimonate and the like, aging the resulting solution, and removing ions with an ion exchange resin and the like.

The modified zirconia fine particles obtained at this time have a refractive index ($P_n$) in a range of approximately 1.80 to 2.10.

(2) Modified Zirconia Fine Particles Coated with Silica

The modified zirconia fine particles may be obtained by adding an alkali silicate aqueous solution to a dispersion solution of zirconium oxide particles having an average particle size of approximately 3 to 100 nm, heating the resulting solution if needed and aging, and then removing ions with an ion exchange resin and the like.

In addition, as an another method, the modified zirconia fine particles may be obtained by adding an alcohol solution of a silicon alkoxide to a dispersion solution of zirconium oxide particles having an average particle size of approximately 3 to 100 nm, adding an acid such as hydrochloric acid, nitric acid and the like or a base such as ammonia and the like as a hydrolysis catalyst if needed and aging the resulting solution.

The modified zirconia fine particles obtained at this time have a refractive index ($P_n$) in a range of approximately 1.50 to 2.00.

(3) Modified Zirconia Fine Particles Coated with Silica and Antimony Pentoxide

The modified zirconia fine particles may be obtained by preparing a dispersion solution of the modified zirconia fine particles coated with antimony pentoxide in the same manner as the (1) and then coating the resulting particles with silica in the same manner as the (2).

In addition, the modified zirconia fine particles may be obtained by preparing a dispersion solution of the modified zirconia fine particles coated with silica in the same manner as the (2) and then coating the resulting particles with antimony pentoxide in the same manner as the (1).

The modified zirconia fine particles obtained at this time have a refractive index ($P_n$) in a range of approximately 1.55 to 2.05.

In the above-mentioned matters, the use amount of antimony pentoxide and/or silica is adjusted so that the content of the coating layer is within the above range. In addition, the use amount of antimony pentoxide and/or silica is adjusted so that the refractive index ($P_n$) is in a range of 1.50 to 2.10, as described later.

Both of them are preferably aged at 50 to 300° C. after coating with antimony pentoxide and/or silica. By aging, the surface potential is reduced and the colloidal characteristics are increased, while the crystallization of the coated antimony pentoxide and/or silica is proceed, and composite oxide particles excellent in dispersion stability are obtained.

Further, as the method for producing the modified zirconia fine particles of the present invention, there is preferably adopted a method for producing the modified zirconia fine particles of the present invention, which is described later.

[Dispersion Sol of Modified Zirconia Fine Particles]

Next, there will be explained a dispersion sol of the modified zirconia fine particles according to the present invention.

The dispersion sol of the modified zirconia fine particles according to the present invention is characterized in that the modified zirconia fine particles are dispersed in water and/or an organic solvent and have a solid content concentration of 1 to 50% by weight.

As the organic solvent, a conventionally known organic solvent may be used, and specifically there may be mentioned alcohols such as methanol, ethanol, propanol, 2-propanol (IPA), butanol, diacetone alcohol, furfuryl alcohol, tetrahydrofurfuryl alcohol, ethylene glycol, hexylene glycol, isopropyl glycol and the like; esters such as methyl acetate ester, ethyl acetate ester, butyl acetate and the like; ethers such as diethyl ether, ethyleneglycol monomethylether, ethyleneglycol monoethylether, ethyleneglycol monobutylether, diethyleneglycol monomethylether, diethyleneglycol monoethylether, propyleneglycol monomethylether and the like; ketones such as acetone, methylethylketone, methylisobutylketone, acetylacetone, acetoacetate ester and the like; methylcellosolve; ethylcellosolve; butylcellosolve; toluene; cyclohexanone; isoholon and the like, and a mixed solvent thereof.

The concentration of a dispersion sol of the modified zirconia fine particles is in a range of preferably 1 to 50% by weight, more preferably 2 to 40% by weight in terms of the solid content.

If the concentration of a dispersion sol of the modified zirconia fine particles is less than 1% by weight in terms of the solid content, in the case of preparing a coating solution for forming a transparent coating film containing the modified zirconia fine particles, a concentrated coating solution may not be prepared. If the concentration of a dispersion sol of the modified zirconia fine particles exceeds 50% by weight in terms of the solid content, the viscosity of the dispersion sol of the modified zirconia fine particles is increased and the stability becomes insufficient, in some cases resulting in gellation.

[Method for Producing Dispersion Sol of Modified Zirconia Fine Particles]

Subsequently, there will be described a method for producing a dispersion sol of the modified zirconia fine particles according to the present invention.

The method for producing the modified zirconia fine particles according to the present invention is characterized by containing the following steps (a) to (c):

(a) a step of preparing a dispersion solution in which there are mixed an aqueous dispersion solution (A) of zirconia fine particles having a concentration of 0.1 to 20% by weight in terms of $ZrO_2$ and an alkali antimonate aqueous solution (B) having a concentration of 0.1 to 20% by weight in terms of $Sb_2O_5$ or an alkali silicate aqueous solution or a tetrafunctional alkoxy silane solution (C) having a concentration of 0.1 to 20% by weight in terms of $SiO_2$, (b) a step of bringing the mixed dispersion solution into contact with a cation-exchange resin, and (c) a step of aging at 50 to 120° C.

Step (a)

As the aqueous dispersion solution (A) of zirconia fine particles, the aqueous dispersion solution of zirconia fine particles described above may be used. In particular, as the dispersion solution of zirconia fine particles used in the present invention, the zirconia sol disclosed in Japanese Patent Laid-Open Publication No. 2006-143535 filed by the present applicants may be suitably used, in which the zirconia fine particles have an average particle size in a range of 5 to 100 nm, have a uniform particle size distribution, and have high crystallinity and a high refractive index.

The concentration of the aqueous dispersion solution (A) of zirconia fine particles is preferably 0.1 to 20% by weight and more preferably 0.2 to 15% by weight in terms of $ZrO_2$.

If the concentration of the aqueous dispersion solution (A) of zirconia fine particles is less than 0.1% by weight in terms of $ZrO_2$, since the concentration is extremely low, large treatment facilities are required and it is not economical because the productivity is low.

If the concentration of the aqueous dispersion solution (A) of zirconia fine particles exceeds 20% by weight in terms of $ZrO_2$, the zirconia fine particles coated with antimony pentoxide and/or silica which are obtained in step (b) are agglomerated in some cases.

As the alkali antimonate aqueous solution (B), an aqueous solution of sodium antimonate, potassium antimonate and the like are used.

The concentration of the alkali antimonate aqueous solution (B) is not particularly limited, but is in a range of preferably 0.1 to 20% by weight and more preferably 0.2 to 15% by weight in terms of $Sb_2O_5$.

As the alkali silicate aqueous solution or tetrafunctional alkoxy silane solution (C), there are used an aqueous solution of sodium silicate, potassium silicate and the like and an alcohol and/or an aqueous solution of tetramethoxysilane, tetraethoxysilane, tetrapropoxysilane, tetrabutoxysilane and the like.

The concentration of the alkali silicate aqueous solution or tetrafunctional alkoxy silane solution (C) is not particularly limited, but is in a range of preferably 0.1 to 20% by weight and more preferably 0.2 to 15% by weight in terms of $SiO_2$.

The concentration of a dispersion solution, in which the aqueous dispersion solution (A) of zirconia fine particles is mixed with the alkali antimonate aqueous solution (B) or the alkali silicate aqueous solution or tetrafunctional alkoxy silane solution (C), is in a range of preferably 0.1 to 20% by weight and more preferably 0.2 to 15% by weight based on the total of the oxide.

If the concentration of the mixed dispersion solution is less than 0.1% by weight based on the total of the oxide, since the concentration is extremely low, large treatment facilities are required and it is not economical because the productivity is low.

If the concentration of the mixed dispersion solution exceeds 20% by weight based on the total of the oxide, the zirconia fine particles coated with antimony pentoxide or silica which is obtained in step (b) are agglomerated in some cases.

The mixing ratio of the aqueous dispersion solution (A) of zirconia fine particles to the alkali antimonate aqueous solution (B) or the alkali silicate aqueous solution or the tetrafunctional alkoxy silane solution (C) is in a range of preferably 0.01 to 2.3 and more preferably 0.02 to 1.5 in terms of the oxide weight ratio $Sb_2O_5/ZrO_2$ or $SiO_2/ZrO_2$.

If the oxide weight ratio $Sb_2O_5/ZrO_2$ or $SiO_2/ZrO_2$ is less than 0.01, the coating layer is thin and the surface is not sufficiently negatively charged in the same manner as that of the antimony oxide colloid particles or silica colloid particles, that is, colloidal characteristics similar to those of antimony oxide or silica are not obtained, the dispersibility and dispersion stability become insufficient, and the modified zirconia fine particles may be agglomerated when they are mixed with other particles or a binder.

If the oxide weight ratio $Sb_2O_5/ZrO_2$ or $SiO_2/ZrO_2$ exceeds 2.3, the ratio of zirconia fine particles, which are core particles, is extremely low, the resulting particles have a low refractive index and modified zirconia fine particles having a desired refractive index may not be obtained.

At this time, the mixed dispersion solution has a pH in a range of approximately 2 to 5.

Step (b)

The dispersion solution mixed in step (a) is brought into contact with a cation-exchange resin.

A conventionally known cation-exchange resin (H type) may be used as the cation-exchange resin, and alkali is eliminated from an alkali antimonate or an alkali silicate by bringing the mixed dispersion solution into contact with the cation-exchange resin, and antimonic acid and silicic acid are precipitated on the surface of zirconia fine particles, thus a coating layer is formed.

Although the use amount of the cation-exchange resin varies depending on the use amount of an alkali antimonate or an alkali silicate, it is used to such a degree that no alkali substantially remains in the dispersion solution of zirconia fine particles coated with antimonic acid or silicic acid after eliminating alkali from an alkali antimonate or an alkali silicate and bringing the mixed dispersion solution into contact with the cation-exchange resin.

Subsequently, the cation-exchange resin is separated from the dispersion solution. The dispersion solution separated from the cation-exchange resin has a pH of preferably 1 to 6 and more preferably 2 to 4.

Step (c)

Then, the dispersion solution is aged, and the aging temperature is preferably 40 to 200° C. and more preferably 60 to 120° C.

If the aging temperature is less than 40° C., when the coating layer is antimony pentoxide, the resulting dispersion sol of the modified zirconia fine particles has insufficient stability probably due to insufficient densification and crystallization, and when the coating layer is silica, the resulting dispersion sol of the modified zirconia fine particles has insufficient stability probably due to insufficient densification.

Even if the aging temperature exceeds 200° C., the stability of the dispersion sol of the modified zirconia fine particles is not further improved and there is no effect that the aging time may be shortened, therefore, it is not considered to be economically significant.

Note that, the aging time varies depending on the temperature but is usually 0.5 to 12 hours.

In the method, there may be obtained a dispersion sol of the modified zirconia fine particles excellent in stability, compared to the method of performing aging before removing ions with an ion-exchange resin and the like after an aqueous solution of an alkali antimonate or an alkali silicate is mixed with a dispersion solution of zirconium oxide particles.

After the step (c), the following steps (d) to (g) are performed, and preferably modified zirconia fine particles surface-treated with an organic silicon compound are formed.

Step (d)

The aqueous dispersion solution of the modified zirconia particles obtained in step (c) is replaced by an organic solvent.

Alcohol is usually used as the organic solvent and the solvent replacement is carried out by ultrafiltration.

The concentration of the organic solvent dispersion solution of the modified zirconia fine particles is not particularly limited, but is in a range of typically 1 to 40% by weight and preferably 2 to 30% by weight in terms of the solid content.

Step (e)

A water and/or organic solvent of an organic silicon compound represented by the following formula (1) is added to the organic solvent dispersion solution obtained in step (d).

$$R_n\text{—}SiX_{4-n} \qquad (1)$$

(Provided that in the formula (1), R represents an unsubstituted or substituted hydrocarbon group having 1 to 10 carbon atoms and may be the same or different from each other. X represents an alkoxy group having 1 to 4 carbon atoms, a hydroxyl group, a halogen atom, and a hydrogen atom; and n is an integer of 1 to 3.)

As such an organic silicon compound, an organic silicon compound similar to the organic silicon compound represented by the formula (1) is used.

The organic silicon compound is used so that the content is in a range of preferably 1 to 50% by weight and more preferably 2 to 30% by weight in terms of $R_n\text{—}SiO_{(4-n)/2}$ in the resulting modified zirconia fine particles.

Step (f)

The organic silicon compound is hydrolyzed to surface-treat the modified zircinia fine particles by adding a hydrolysis catalyst if needed.

As the hydrolysis catalyst, a conventionally known acid or alkali is used.

Note that, water is added when water is not contained in the dispersion solution. The addition amount of water may be an amount conventionally known, and water is added so that the organic silicon compound may be sufficiently hydrolyzed.

Step (g)

Thereafter, the aging is performed at 30 to 120° C. and more preferably at 50 to 80° C.

If the aging temperature is less than 30° C., there may be a case that the hydrolysis is not completed, or a case that the hydrolysis product is insufficiently bonded to the particle surface and the surface-treatment effect is not sufficiently obtained.

Since the surface-treatment effect is not further increased even if the aging temperature exceeds 120° C., the aging temperature is preferably in the above range from the viewpoint of efficiency, handling and the like.

In addition, the aging time varies depending on the temperature and is usually 0.5 to 2 hours.

A dispersion sol of the modified zirconia fine particles may be prepared by replacing the dispersion solution of the modified zirconia fine particles or the dispersion solution of the surface-treated modified zirconia fine particles obtained above with an appropriate dispersion medium.

As the dispersion medium, the water and/or organic solvents described above are used, which vary depending on the application.

The resulting dispersion sol of the modified zirconia fine particles has a solid content concentration of preferably 1 to 50% by weight and more preferably 2 to 40% by weight.

In addition, the resulting modified zirconia fine particles have an average particle size of preferably 5 to 120 nm and more preferably 10 to 100 nm.

Further, the modified zirconia fine particles have a refractive index of preferably 1.5 to 2.1 and more preferably 1.8 to 2.1.

[Substrate with Hard Coat Film]

The substrate with a hard coat film of the present invention is composed of a substrate and a hard coat film formed on the substrate.

Substrate

The substrate used in the present invention includes a conventionally known glass, cyclopolyolefin film, a cellulose substrate such as triacetylcellulose film (TAC), diacetylcellulose film, acetatebutyratecellulose film and the like; a polyester substrate such as polyethyleneterephthalate (PET), polyethylenenaphthalate and the like; a polyolefin substrate such as polyethylene film, polypropylene film, cyclic polyolefin film and the like; a polyamide substrate such as Nylon-6, Nylon-66 and the like; and a substrate such as polyacrylic film, polyurethane film, polycarbonate film, polyether film, polyethersulfone film, polystyrene film, polymethylpentene film, polyetherketone film, acrylonitrile film and the like. In addition, there may also be suitably used a synthetic resin lens substrate conventionally used as a glass lens substrate such as a sulfur-containing urethane resin substrate obtained by reacting one or more kinds of mercapto compounds with one or more kinds of polyisocyanates, a synthetic resin substrate which is a copolymer obtained from a (meth)acryl monomer and/or a vinyl monomer having a sulfur atom and an aromatic ring as a constituent, and other polymerizable monomer, which were disclosed in Japanese Patent Laid-Open Publication No. H08-48940.

Such a substrate has a refractive index of preferably 1.45 to 1.80 and more preferably 1.48 to 1.78.

If the substrate has a refractive index of less than 1.45, the composite oxide particles of the present invention has a refractive index of 1.50 or more and the difference between the refractive index of the resulting transparent coating film and the refractive index of the substrate is 0.3 or higher. Thus, interference fringes occur and application unevenness is easily recognized in some cases.

If the substrate has a refractive index exceeding 1.80, such a transparent substrate per se is difficult to obtain.

Hard Coat Film

The hard coat film contains a matrix component and the composite oxide particles having a core-shell structure composed of a core formed from zirconium oxide and a shell formed from antimony pentoxide and/or silica. Since the surface of such composite oxide particles is coated with the antimony pentoxide or silica having excellent dispersibility, the dipsersibility and dispersion stability may be increased. In addition, although zirconium oxide has a high refractive index, by forming the shell, the refractive index may be arbitrarily controlled, and also haze and light scattering may be suppressed.

(i) Composite Oxide Particles

As the composite oxide particles having a core-shell structure used in the present invention, those composed of zirconia particles (hereinafter simply may be referred to as core particles) and a shell layer are used, and specifically the modified zirconia fine particles may be used.

The zirconia core particles have an average particle size of preferably 3 to 100 nm and more preferably 5 to 80 nm. The zirconia core particles having a small average particle size are difficult to obtain, and even if the particles are obtained, since the particles have low crystallinity in an amorphous state and are not sufficiently positively charged on the surface of particles, the particles have low dispersion stability and may be agglomerated, therefore, the coating layer is difficult to be formed. If the zirconia core particles have an extremely large average particle size, light scattering is increased and haze of the hard coat film is increased in some cases.

A coating layer (hereinafter simply may be referred to as the shell) composed of antimony pentoxide and/or silica is formed on the surface of core particle. In the present invention, it is preferable that the outermost layer of the composite oxide particles is antimony pentoxide because the refractive index is high and the conductivity is developed.

As an embodiment of the present invention, there may be mentioned, in addition to a two layer structure of a zirconia core-antimony pentoxide shell, a zirconia core-silica shell, and a zirconia core-silica/antimony pentoxide composite oxide shell; a zirconia core-silica intermediate layer-antimony pentoxide outermost layer, a zirconia core-antimony pentoxide intermediate layer-silica outermost layer, a zirconia core-antimony pentoxide first layer-silica second layer-antimony pentoxide outermost layer, and further a zirconia core-antimony pentoxide/silica composite oxide intermediate layer-antimony pentoxide outermost layer and the like.

In addition, when used in the hard coat film, the composite oxide particles have a volume resistance value of preferably $10^{-2}$ to $10^{4}$ $\Omega \cdot cm$ and more preferably $10^{-1}$ to $10^{3}$ $\Omega \cdot cm$. If the composite oxide particles have a volume resistance value in the range, they are suitably used because a hard coat film having antistatic performance in addition to abrasion resistance may be obtained. Further, the volume resistance value of the particles is measured as follows.

Firstly, a sample is subjected to drying treatment, the dried powders are filled in a cell, an electrode equipped with terminals at the upper and lower ends is installed, and a pressure of 9.8 MPa is applied. Next, the distance (B) between the terminals is measured by a slide caliper and the resistance value (A) is measured with an electrometer, Type 6517, manufactured by Toyo Corporation. The volume resistance value is calculated by the following equation (3).

$$\text{Volume Resistance Value}=[A-A'](\Omega)/[B-B'](cm) \times 0.5 \text{ } (cm^2) \quad (3)$$

B' and A' are the distance between the terminals and the resistance value, respectively, in a state where a sample is not filled when applying a pressure of 9.8 MPa. In addition, the constant 0.5 ($cm^2$) is the area of the cell.

The ratio of the shell in the composite oxide particles is in a range of preferably 1 to 70% by weight and more preferably 3 to 50% by weight in terms of the oxide. If the ratio of the shell in composite oxide particles is extremely small, the shell layer is thin and is not positively charged in the similar manner to that of antimony pentoxide or silica, that is, colloidal characteristics similar to those of antimony oxide or silica are not obtained, the dispersibility and dispersion stability become insufficient, and the composite oxide particles may be agglomerated when they are mixed with other particles or a binder.

If the ratio of the shell in the composite oxide particles is extremely large, the ratio of zirconia, which is a core particle, is extremely small, the resulting particles have a low refractive index and the composite oxide particles having a desired refractive index may not be obtained.

A method for producing such composite oxide particles is not particularly limited as long as particles in which the zirconium oxide core is coated with antimony pentoxide and/or silica are obtained. For example, the methods are shown as follows.

(1) In the Case of Composite Oxide Particles Coated With Antimony Pentoxide

The composite oxide particles may be obtained by mixing an aqueous solution of sodium antimonate, potassium antimonate and the like with a dispersion solution of zirconium oxide particles having an average particle size of approximately 3 to 100 nm, aging the resulting solution, and removing ions with an ion exchange resin and the like. The composite oxide particles obtained at this time have a refractive index ($P_n$) in a range of approximately 1.80 to 2.10.

(2) In the Case of Composite Oxide Particles Coated With Silica

The composite oxide particles may be obtained by adding an alkali silicate aqueous solution to a dispersion solution of zirconium oxide particles having an average particle size of approximately 3 to 100 nm, heating the resulting solution if needed and aging, and then removing ions with an ion exchange resin and the like. In addition, as an another method, the composite oxide particles may be obtained by adding an alcohol solution of a silicon alkoxide to a dispersion solution of zirconium oxide particles having an average particle size of approximately 3 to 100 nm and aging the resulting solution by adding an acid such as hydrochloric acid, nitric acid and the like or a base such as ammonia and the like as a hydrolysis catalyst if needed. The composite oxide particles obtained at this time have a refractive index ($P_n$) in a range of approximately from 1.50 to 2.00.

(3) In the Case of Composite Oxide Particles Coated With Silica and Antimony Pentoxide The composite oxide particles may be obtained by preparing a dispersion solution of the composite oxide particles coated with silica in the same manner as the (2) and then coating the resulting particles with antimony pentoxide in the same manner as the (1).

The composite oxide particles obtained at this time have a refractive index ($P_n$) in a range of approximately 1.55 to 2.05.

In the above-mentioned matters, the use amount of antimony pentoxide and/or silica is adjusted so that the content of the shell is in the above range. In addition, antimony pentoxide and/or silica are used so that the refractive index ($P_n$) is in a range of 1.50 to 2.10, as described later.

Both of these composite oxide particles are preferably aged at 50 to 300° C. after coating with antimony pentoxide and/or silica. By aging, the crystallization of the coated antimony pentoxide and/or silica to proceed, and composite oxide particles excellent in dispersion stability are obtained. In addition, as such a production method, a production method of the modified zirconia fine particles may be adopted.

In other words, the composite oxide particles may be produced from the steps (a) to (c), and further may be produced by performing the steps (d) to (g) following the step (c).

The composite oxide particles used in the present invention preferably have a refractive index of 1.50 to 2.10. It is difficult to obtain composite oxide particles having a refractive index outside the above range, and even if they are obtained, they have insufficient dispersion stability. In addition, even if a hard coat film is formed, it has insufficient adhesiveness with a substrate, film strength and the like and further causes interference fringes in some cases.

The refractive index of the composite oxide particles may be measured by a standard solution method for refractive index. Note that, in the present invention, zirconia has a refractive index of 2.15, antimony pentoxide has that of 1.68 and silica has that of 1.43.

The refractive index of the composite oxide particles may be controlled by changing the coating amount of antimony pentoxide or silica.

The composite oxide particles have an average particle size of preferably 5 to 120 nm and more preferably 10 to 100 nm. It is difficult to obtain the composite oxide particles having a small average particle size, and even if they are obtained, they have insufficient dispersibility and the like. If they have extremely large an average particle size, the haze of the hard coat film tends to be deteriorated.

The composite oxide particles used in the present invention are preferably surface-treated with an organic silicon compound. As the organic silicon compound, an organic silicon compound such as a conventionally known silane coupling agent and the like may be used, and specifically an organic silicon compound represented by the formula (1) may be mentioned. In particular, when used in a hard coat film, the organic silicon compound is preferably an organic silicon compound represented by the following formula (1-1), or an organic silicon compound represented by the following formula (1-2).

$$R^1(X')_m\text{—}Si(OR^2)_3 \quad (1\text{-}1)$$

(In the formula, $R^1$ represents a organic group having 1 to 10 carbon atoms derived from a substituted or unsubstituted hydrocarbon. X' represents one or more kinds of functional groups selected from a (meth)acryloyl group, an epoxy group (a glycide group), an urethane group, an amino group and a fluoro group, and m is an integer of 1 or more. $R^2$ represents a organic group having 1 to 10 carbon atoms derived from a substituted or unsubstituted hydrocarbon.)

$$Si(OR^3) \quad (1\text{-}2)$$

(In the formula, $R^3$ represents a hydrogen atom, a halogen atom, a organic group having 1 to 10 carbon atoms derived from a substituted or unsubstituted hydrocarbon group.)

The organic silicon compound (1-1) specifically includes 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltrimethoxysilane, γ-(meth)acryloxypropyltriethoxysilane, 3-ureidopropyltriethoxysilane, perfluorooctylethyltrimethoxysilane, perfluorooctylethyltriethoxysilane, perfluorooctylethyltriisopropoxysilane, trifluoropropyltrimethoxysilane, N-β(aminoethyl)γ-aminopropylmethyldimethoxysilane, N-β-aminoethyl)γ-aminopropyltrimethoxysilane, N-phenyl-γ-aminopropyltrimethoxysilane and the like.

If the composite oxide particles are surface-treated with such an organic silicon compound (1-1), they are improved in dispersion stability in the matrix of the modified zirconia fine particles, and a hard coat film of which surface is smooth and which is excellent in abrasion resistance and pencil hardness is formed. The treating amount of the organic silicon compound (1-2) is, although it depends on the refractive index of composite oxide particles, preferably 1 to 50% by weight and more preferably 3 to 30% by weight assuming that the organic silicon compound (1-1) in the resulting surface-treated composite oxide particles is X—R—$SiO_{3/2}$. If the treating amount of the organic silicon compound (1-1) is extremely small, the surface treatment is insufficient and the improvement effect of dispersion stability may not be sufficiently obtained. If the treating amount of the organic silicon compound is extremely large, the refractive index of the surface-treated composite oxide particles is extremely low and the difference between the refractive index of the surface-treated composite oxide particles and the refractive index of the substrate may be 0.3 or higher and optical interference (interference fringes) may occur.

The organic silicon compound (1-2) includes tetramethoxysilane, tetraethoxysilane, tetrapropoxysilane, tetrabutoxysilane and the like. The organic silicon compound (1-2) may be used by mixing with the organic silicon compound (1-1). In addition, if the composite oxide particles are surface-treated with the organic silicon compound (1-2) in advance and then is surface-treated with the organic silicon compound (1-1), it is desirable because the resulting surface-treated composite oxide particles tend to be improved in dispersion stability and the use amount of the organic silicon compound represented by the formula (1-1) may be reduced in some cases probably due to the enhanced bonding with the organic silicon compound (1-1) (a hydrolysis product of an organic silicon compound).

The treating amount of the organic silicon compound (1-2) at this time is preferably 70% by weight or less and more preferably 60% by weight or less assuming that the organic silicon compound in the resulting surface-treated composite oxide particles is $SiO_2$. In addition, the lower limit of the treating amount of the organic silicon compound (1-2) is preferably 1% by weight or more and more preferably 3% by weight or more, although there is no problem as long as the organic silicon compound (1-2) is contained. If the treating amount of the organic silicon compound (1-2) is extremely large, the resulting surface-treated composite oxide fine particles may have a low refractive index outside the above range. If the treating amount of the organic silicon compound is extremely small, the organic silicon compound (1-1) is insufficiently bonded and a sufficient surface-treatment effect may not be obtained.

The surface treatment of composite oxide particles may be performed by a conventionally known method in which an organic silicon compound is hydrolyzed by adding a predetermined amount of the organic silicon compound to an alcohol dispersion solution of the composite oxide particles, and adding water to the resulting mixture, and then adding acid or alkali as a catalyst for hydrolysis of the organic silicon compound if needed.

The content of the composite oxide particles in the hard coat film is in a range of preferably 5 to 90% by weight and more preferably 10 to 80% by weight. If the content of the composite oxide particles is extremely small, it is difficult to obtain a hard coat film which is excellent in abrasion resistance, scratch strength, pencil hardness and the like, and it is difficult to adjust the difference between the refractive index of the hard coat film and the refractive index of the substrate. If the content of the composite oxide particles is extremely large, the matrix component is conversely small, and it is difficult to obtain a hard coat film which is excellent in adhesiveness with a substrate, abrasion resistance, scratch strength, pencil hardness and the like.

Matrix Component

As the matrix component, there are used a silicon (sol-gel) matrix component and an organic resin matrix component.

As the silicon matrix component, there are suitably used a hydrolysis product and a hydrolysis polycondensation product of an organic silicon compound represented by the following formula (3).

$$R_q\text{—}SiX_{4-q} \quad (3)$$

(Provided that in the formula, R represents an unsubstituted or substituted hydrocarbon group having 1 to 10 carbon atoms and may be the same or different from each other. X represents an alkoxy group having 1 to 4 carbon atoms, a hydroxyl group, a halogen atom and a hydrogen atom, and q is an integer of 0 to 3.)

Such an organic silicon compound includes, tetramethoxysilane, tetraethoxysilane, tetrapropoxysilane, tetrabutoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(βmethoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxyslane, γ-glycidoxyethyltrimethoxysilane, γ-glycidoxyethyltriethoxysilane, γ-glycidoxypropyltrimethoxysilane, γ-glycidoxypropyltriethoxysilane, γ-(β-glycidoxyethoxy)propyltrimethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysiilane, γ-(meth)acryloxypropyltrimethoxysilane, γ-(meth)acryloxypropyltriethoxysilane, butyltrimethoxysilane, isobutyltriethoxysilane, hexyltriethoxysilane, octyltriethoxysilane, decyltriethoxysilane, butyltriethoxysilane, isobutyltriethoxysilane, hexyltriethoxysilane, octyltriethoxysilane, decyltriethoxysilane, 3-ureido-isopropylpropyltriethoxysilane, perfluorooctylethyltrimethoxysilane, perfluorooctylethyltriethoxysilane, perfluorooctylethyltriisopropoxysilane, trifluoropropyltrimethoxysilane, γ-mercaptopropyl trimethoxy silane, trimethylsilanol, methyltrichlorosilane and the like, and a mixture thereof.

In addition, the organic resin matrix component includes a thermosetting resin, a thermoplastic resin, an electron beam curing resin and the like, which are well known as a resin for coating material.

As such a resin includes, which has been conventionally used, there may be mentioned, for example, a thermoplastic resin such as polyester resin, polycarbonate resin, polyamide resin, polyphenylene oxide resin, thermoplastic acrylic resin, vinyl chloride resin, fluorine resin, vinyl acetate resin, silicon rubber and the like; a thermosetting resin and an ultraviolet-curing acrylic resin such as urethane resin, melamine resin, silicon resin, butyral resin, reactive silicon resin, phenol resin, epoxy resin, unsaturated polyester resin, thermosetting acrylic resin, an ultraviolet-curing acrylic resin and the like; and others. In the case of a thermosetting resin and an electron beam curing resin, they are a cured product (that is, a polymerization product and reaction product) in the hard coat film.

Specifically there may be mentioned pentaerythritol triacrylate, pentaerythritol tetraacrylate, trimethylolpropane tri(meth)acrylate, pentaerythritol tetraacrylate, ditrimethylolpropane tetra(meth)acrylate, dipentaerythritol hexaacrylate, methylmethacrylate, ethylmethacrylate, butylmethacrylate, isobutylmethacrylate, 2-ethylhexylmethacrylate, isodecylmethacrylate, n-laurylacrylate, n-stearylacrylate, 1,6-hexanediole dimethacrylate, perfluorooctylethylmethacrylate, trifluoroethylmethacrylate, urethaneacrylate, fluorene-skeleton-containing acrylate and the like, and a mixture thereof. In addition, they may be two or more copolymers or modified polymers of these resins.

These resins may be an emulsion resin, a water-soluble resin and a hydrophilic resin. Further, in the case of the thermosetting resin, it may be either an ultraviolet-curing resin or an electron beam curing resin, and in the case of the thermosetting resin, a curing catalyst may be contained. As the matrix component contained in the hard coat film, a resin matrix component is suitably used.

The hard coat film of the present invention may contain, in addition to the composite oxide particles, one or more kinds selected from oxide fine particles, pigment fine particles and metal (including an alloy) fine particles as long as the abrasion resistance is not impaired. The oxide fine particles include silica, alumina, titanium oxide, tin oxide, zinc oxide, antimony pentoxide, indium oxide, low-order titanium oxide, magnesium oxide, boria, niobium oxide and the like, and a composite oxide thereof or Sb-doped tin oxide (ATO) or the like. Further, in addition to these, there may be used F-doped tin oxide, P-doped tin oxide, Sn-doped indium oxide (ITO), F-doped indium oxide and the like by mixing, a small amount of which may be mixed as long as particles of which surfaces are positively charged are not agglomerated.

If the hard coat film contains these oxide fine particles, it may have the effects of not only the refractive index adjustment of a hard coat but also the improvement in abrasion resistance, improvement in pencil hardness and the addition of conductivity or improvement in conductivity.

The pigment fine particles include an inorganic pigment such as zinc oxide, titanium white, lithopone, white lead, barite, colcothar, chrome yellow, cobalt blue, carbon black, yellow ochre, emerald green, cobalt green, ultramarine, Prussian blue, manganese violet, cobalt violet, gold, silver and the like; an azo pigment such as benzine yellow, Carmine FB and the like; and an organic pigment such as perylene, perynone, dioxazine, thioindigo, isoindolinone, quinophthalone, quinacridone, phthalocyanine-based pigment, Lake Red, Methyl Violet Lake, eosine lake, green gold, pyrromethene pigment, tetraazaporphyrin, squaririum and the like. If the hard coat film contains these pigment fine particles, the absorption of a specific wavelength is obtained and the function as a selective absorption filter may be given.

The metal fine particles include Ag, Pd, Au, Ru, Cu, Nd, Pt and the like, and an alloy thereof. If the hard coat film contains such metal fine particles, the improvement in refractive index, addition of conductivity and function as a selective absorption filter may be given.

The content of the oxide fine particles, pigment fine particles and metal (including an alloy) fine particles is adjusted so that the total with the composite oxide particles in the hard coat film is in a range of preferably 5 to 90% by weight and more preferably 10 to 80% by weight.

The hard coat film has a thickness of preferably 0.1 to 30 µm, more preferably 0.5 to 20 µm and especially preferably 1 to 10 µm.

If the hard coat film has a thickness of less than the lower limit of the above range, the hard coat function becomes insufficient because the hard coat film is thin and the stress applied on the hard coat film surface may not be sufficiently absorbed. If the hard coat film has a thickness exceeding the upper limit of the above range, it is difficult to apply a resin so that the thickness of a film is uniform and to dry the resin evenly. For this reason, the resulting hard coat film has insufficient strength and further has insufficient transparency due to the occurrence of cracking or voids.

The difference between the refractive index of such a hard coat film and the refractive index of a substrate is preferably 0.3 or lower and more preferably 0.2 or lower. If the difference between the refractive index of a hard coat film and the refractive index of a substrate is extremely high, interference fringes may occur and the reflection property may be deteriorated in some cases.

The refractive index of a hard coat film is measured by an ellipsometer (manufactured by SOPRA), and the adjusting method is performed by adjusting the type and blending ratio of a matrix and particles.

When the outermost layer is antimony pentoxide, the hard coat film of the present invention has a surface resistance value of preferably $10^8$ to $10^{14}$ Ω/sq and more preferably $10^8$ to $10^{13}$ Ω/sq. It is difficult to obtain a hard coat film having a surface resistance value lower than the above range from the composite oxide particles of the present invention, and if a large amount of metal particles and metal oxide fine particles is used in order to increase conductivity, the hard coat film may insufficiently have abrasion resistance and permeability. If the surface resistance value of a hard coat film is extremely high, the antistatic effect is not obtained, and for example, much dust adheres to the substrate surface in some cases.

Such a hard coat film may be formed by coating, drying and curing a coating solution for forming a hard coat film according to the present invention, which is described later.

In a substrate with a hard coat film of the present invention, the above-mentioned hard coat film may be provided not only on the one side surface of the substrate but also on the both sides, and further, there may be formed, in addition to the hard coat film, a conventionally known primer film, high refractive index film, conductive film and antireflection film, if needed.

[Coating Solution for Forming Hard Coat Film]

A coating solution for forming a hard coat film according to the present invention contains a matrix-forming component, the composite oxide particles and a dispersion medium.

Composite Oxide Particles

As composite oxide particles, the composite oxide particles above-mentioned are used.

The composite oxide particles in the coating solution for forming a hard coat film, which is used so that the content of the composite oxide particles in the resulting hard coat film is in a range of 5 to 90% by weight and more preferably 10 to 80% by weight as mentioned above, has a concentration of preferably 0.1 to 40% by weight and more preferably 0.2 to 30% by weight in terms of the solid content in the coating solution.

In the present invention, the hard coat film may contain, in addition to the composite oxide particles, one or more kinds selected from the oxide fine particles, pigment fine particles and metal (including an alloy) fine particles as long as dispersion stability, abrasion resistance and the like are not impaired.

Matrix-Forming Component

As the matrix-forming component, there are used a silicon (sol-gel) matrix-forming component and an organic resin matrix-forming component.

As the silicon matrix-forming component, the organic silicon compound represented by the formula (3 the hydrolysis product and the hydrolysis polycondensation product thereof are suitably used.

In addition, the organic resin matrix-forming component includes a thermosetting resin, a thermoplastic resin, an electron beam curing resin and the like, which are well known as a resin for coating material. In the case of a thermoplastic resin, the matrix-forming component and the matrix component are the same, and in the case of a thermosetting resin and electron beam curing resin, the matrix-forming component is a precursor (that is, a monomer or oligomer) of these resins. Specifically, the matrix-forming component is as mentioned above.

The total concentration of the solid content concentration ($C_p$) of the composite oxide particles in a coating solution for forming a hard coat film and the solid content concentration ($C_M$) of the matrix-forming component is in a range of preferably 2 to 50% by weight and more preferably 3 to 40% by weight.

If the total solid content concentration in a coating solution is extremely low, the hard coat film may have a thin thickness and may be insufficient in the performance, for example, abrasion resistance or strength in some cases. For this reason, the film thickness may be increased by repeating coating, drying and the like, but economic efficiency is reduced. In addition, if the total solid content concentration in a coating solution is extremely high, the coating performance may be decreased because the viscosity of a coating solution is increased, and the stability of a coating solution may become insufficient, and therefore the adhesiveness, strength and the like of the resulting hard coat film may be reduced.

The composite oxide particles in a coating solution for forming a hard coat film have a solid content concentration ($C_p$) of preferably 0.1 to 40% by weight and more preferably 0.2 to 30% by weight.

If the solid content concentration ($C_p$) is extremely low, the properties of the composite oxide particles, for example, conductivity, refractive index and the like may not be sufficiently developed because the content of the metal oxide particles in the resulting transparent coating film becomes low. If the solid content concentration ($C_p$) is extremely high, the interaction between particles is high, the viscosity of a coating material is increased, and the stability with time becomes insufficient in some cases.

In addition, the matrix-forming component in a coating solution for forming a hard coat film has a concentration (CM) of preferably 1.9 to 49.9% by weight and more preferably 2.8 to 40% by weight in terms of the solid content. If the concentration ($C_M$) of the matrix-forming component is extremely low, the resulting hard coat film has a extremely thin thickness and may be insufficient in the performance, for example, hard coat performance or transparency and in the adhesiveness and the like because the ratio of particles is extremely large. If the concentration ($C_M$) of the matrix-forming component is extremely high, the properties of the composite oxide particles, for example, conductivity, refractive index and the like may not be sufficiently developed because the resulting hard coat film has a high content of a matrix and conversely has a low content of the composite oxide particles.

Further, the ratio of the concentration (Cp) in terms of the solid content of the surface-treated metal oxide particles in a coating solution for forming a hard coat film to the concentration ($C_M$) in terms of the solid content of a matrix-forming component is adjusted so that the content of the surface-treated metal oxide particles in the resulting transparent coating film is in a range of preferably 5 to 90% by weight and more preferably 10 to 80% by weight.

Dispersion Medium

The dispersion medium used in the present invention is not particularly limited as long as it may dissolve or disperse a matrix-forming component and a polymerization initiator which is used if needed, and a conventionally known dispersion medium may be used.

Specifically, the dispersion medium includes water; alcohols such as methanol, ethanol, propanol, 2-propanol (IPA), butanol, diacetone alcohol, furfuryl alcohol, tetrahydrofurfuryl alcohol, ethylene glycol, hexylene glycol, isopropyl glycol and the like; esters such as methyl acetate ester, ethyl acetate ester, butyl acetate and the like; ethers such as diethyl ether, ethyleneglycol monomethylether, ethyleneglycol monoethylether, ethyleneglycol monobutylether, diethyleneglycol monomethylether, diethyleneglycol monoethylether, propyleneglycol monomethylether and the like; ketones such as acetone, methylethylketone, methylisobutylketone, acetylacetone, acetoacetate ester and the like; methylcellosolve, ethylcellosolve, butylcellosolve, toluene, cyclohexanone, isoholon and the like.

In addition, a coating solution may contain a solvent which dissolves a matrix-forming component and is easily volatilized, and when the matrix-forming component is a thermosetting resin, a curing agent may be blended if needed. Further, a surfactant and the like may also be added to a coating solution in order to increase dispersibility and stability.

A hard coat film may be formed by coating such a coating solution on the substrate described above by a well-known method such as a dip method, a spray method, a spinner method, a roll coat method and the like, drying, thermally treating and curing by ultraviolet radiation and the like.

EXAMPLES

Hereinafter, the present invention will be explained in more detail by Examples, but the invention is by no means limited by these Examples.

Example A1

Preparation of Dispersion Solution of Modified Zirconia Fine Particles (A-1)

Preparation of Zirconia Sol (A-1)

A zirconium hydroxide hydrogel ($ZrO_2$ concentration: 1% by weight) was prepared by dissolving 35 g of zirconium oxychloride octahydrate ($ZrOCl_2 \cdot 8H_2O$) in 1302 g of purified water, and to the resulting solution, 122.8 g of a KOH aqueous solution having a concentration of 10% by weight was added. Subsequently, the zirconium hydroxide hydrogel was precipitated by allowing to stand for 5 hours, and 750 g of a supernatant liquid (PH: 11.0) was removed. Then, 750 g of purified water was added and stirred, and again the resulting solution was left to stand still for 5 hours. The above operations were repeated until the conductivity of the supernatant liquid was 0.5 mS/cm or less.

To the resulting zirconium hydroxide hydrogel, 0.96 g of tartaric acid was added, and the mixture was sufficiently stirred. Subsequently, a KOH aqueous solution having a concentration of 10% by weight was added until the pH was 11.0, and the hydrogel was subjected to dispersion treatment by ultrasonic irradiation for one hour, and then the mixture was washed using an ultrafilter membrane until the conductivity was 0.35 mS/cm or less. Thereafter, 2.6 g of an anion-exchange resin (Duolite UP5000, manufactured by Rohm and Haas Company) was added to remove ions. Subsequently, the resulting zirconium hydroxide hydrogel was filled in an autoclave, and was subject to hydrothermal treatment at 165° C. for 6 hours. The pH at this time was 10.7. Subsequently, a dispersion solution obtained by the hydrothermal treatment was dried, and the resulting product was sintered at 650° C. for 2 hours to obtain zirconia powders. The resulting zirconia powders were mixed crystals of cubic crystals and monoclinic crystals.

Next, 36 g of the zirconia powder was added to an aqueous solution obtained by dissolving 4.4 g of tartaric acid in 161.9 g of purified water, and the resulting solution was added with 30 g of a KOR aqueous solution having a concentration of 10% by weight to prepare a zirconia powder dispersion solution having a pH of 12.3. The zirconia powder dispersion solution was dispersed with a dispersing machine (BATCH SAND, manufactured by Kansai Paint Co., Ltd.) to prepare a zirconia sol. The resulting zirconia sol was set in a centrifuge and centrifuged at 2500 rpm for 5 minutes, and then washed using an ultrafilter membrane until the conductivity was approximately 100 μS/cm. Subsequently, the resulting zirconia sol was deionized by adding 40 g of an anion-exchange resin (Duolite UP5000), and from the resulting product, a resin was separated to prepare a zirconia sol (A-1) having a $ZrO_2$ concentration of 1% by weight.

The zirconia fine particles observed by a transmission electron microscope (TEM) showed that there were no coarse particles and the like and there were zirconia fine particles having an average particle size of 30 nm. In addition, the zirconia fine particles were mixed crystals of cubic crystals and monoclinic crystals and had a refractive index of 2.1.

Antimony Pentoxide Coating

An aqueous solution was prepared by mixing 210 g of the zirconia sol (A-1) and 90 g of a potassium antimonate aqueous solution (having a concentration of 1% by weight in terms of $Sb_2O_5$). The resulting aqueous solution was passed through an ion exchange column filled with 330 g of a cation-exchange resin (DAIAION PK-216H, manufactured by Mitsubishi Chemical Corporation), and the resulting solution was aged at 90° C. for one hour to prepare an antimony pentoxide-coated zirconia sol (A-1). The resulting sol had a pH of 2.6.

Silica Coating

A solution was prepared by adding 1.15 g of tetraethoxysilane (Ethylsilicate-A, manufactured by Tama Chemicals Co., Ltd.) to 277 g of the resulting antimony pentoxide-coated zirconia sol (A-1), followed by adding 277 g of methanol. The resulting solution was aged at 50° C. for 15 hours. Subsequently, the solvent was replaced by methanol using an ultrafilter membrane to prepare an alcohol dispersion solution (A-1) of antimony pentoxide/silica-coated zirconia fine particles having a solid content concentration of 2% by weight.

Surface Treatment

Thereafter, 0.18 g of γ-methacryloxypropyltrimethoxysilane (KBM-503, manufactured by Shin-Etsu Chemical Co., Ltd.) was added to 119 g of the alcohol dispersion solution (A-1) of antimony pentoxide/silica-coated zirconia fine particles, and the resulting solution was aged at 50° C. for 16 hours to prepare a dispersion solution of modified zirconia fine particles (A-1) having a solid content concentration of 2% by weight.

The average particle size and refractive index were measured for the resulting modified zirconia fine particles (A-1), and the results are shown in Table 1. In addition, the concentration of the dispersion solution of the modified zirconia fine particles (A-1) was adjusted to 1% by weight, a portion of the dispersion solution was taken and to the portion 0.1 N HCl aqueous solution was added to prepare a dispersion solution with a pH of 3, and to another portion a 0.1 N NaOH aqueous solution was added to prepare a dispersion solution with a pH of 10. As the surface potential, a zeta potential was measured for the dispersion solutions using a zeta-potential measurement apparatus (Zetasizer 3000HS, manufactured by Sysmex Corporation), and the results are shown in Table 1.

Further, as an evaluation of the dispersibility, a substrate with a transparent coating film was prepared by the following method, and the haze of the transparent coating film was measured. The results are shown in Table 1.

Preparation of Substrate (A-1) With Transparent Coating Film

There was prepared a resin component for forming a transparent coating film having a resin concentration of 30% by weight by diluting an acrylic resin (17-824-9, manufactured by DIC Corporation, Resin concentration: 79.8% by weight, Solvent: butyl acetate) with isopropyl alcohol/methylisobutylketone (1:1).

There was prepared a coating solution (A-1) for forming a transparent coating film by mixing 10 g of a dispersion solution of the modified zirconia fine particles (A-1) with 10 g of the resin component for forming a transparent coating film.

The coating solution (A-1) for forming a transparent coating film was applied on a PET film (Cosmoshine A4100, manufactured by Toyobo Co., Ltd., Thickness: 188 μm, Refractive index: 1.67, Substrate haze: 0.8%) by a bar coater method (#14) and dried at 80° C. for 120 seconds, and then cured by irradiation with ultraviolet rays with a dose of 600 $mJ/cm^2$ to produce a substrate (A-1) with a film. The haze of the resulting transparent coating film was measured by a haze meter (manufactured by Suga Test Instruments Co., Ltd.). From the haze and appearance observation results of the transparent coating film, the dispersibility in the transparent coating film of the modified zirconia fine particles was evaluated as follows.

Observation Criteria

Equal to the haze of the substrate: Excellent

The haze is slightly increased but the increase is not visually distinguishable: Good The haze is increased and whitening is visually observed: Fair The haze is significantly increased and remarkable whitening is visually observed: Poor Example A2

Preparation of Modified Zirconia Fine Particles (A-2) Antimony Pentoxide Coating 240 g of zirconia sol (A-1) prepared in the same manner as in Example A1 and 60 g of a potassium antimonate aqueous solution (a concentration of 1% by weight in terms of $Sb_2O_5$) were mixed. Subsequently, the resulting aqueous solution was filtered through an ion exchange column filled with 330 g of a cation-exchange resin (DAIAION PK-216H, manufactured by Mitsubishi Chemical Corporation), and the resulting solution was aged at 90° C. for one hour to prepare an antimony pentoxide-coated zirconia sol (A-2) The resulting sol had a pH of 2.5.

Silica Coating

An alcohol dispersion solution (A-2) of antimony pentoxide/silica-coated zirconia fine particles having a solid concentration of 10% by weight was prepared in the same manner as in Example A1 except for using 277 g of the antimony pentoxide-coated zirconia sol (A-2).

Surface Treatment

Next, a dispersion solution of the modified zirconia fine particles (A-2) having a solid concentration of 2% by weight was prepared in the same manner as in Example A1 except for using 119 g of an alcohol dispersion solution of the antimony pentoxide/silica-coated zirconia fine particles (A-2).

For the resulting modified zirconia fine particles (A-2), the average particle size, refractive index, surface potential and dipsersibility were measured, and the results are shown in Table 1.

Example A3

Preparation of Dispersion Solution of Modified Zirconia Fine Particles (A-3)

Antimony Pentoxide Coating 150 g of zirconia sol (A-1) prepared in the same manner as in Example A1 and 150 g of a potassium antimonate aqueous solution (a concentration of 1% by weight in terms of $Sb_2O_5$) were mixed. Subsequently, the resulting aqueous solution was filtered through an ion exchange column filled with 330 g of a cation-exchange resin (DAIAION PK-216H, manufactured by Mitsubishi Chemical Corporation), and the aged at 90° C. for one hour to prepare an antimony pentoxide-coated zirconia sol (A-3). The resulting sol had a pH of 2.7.

Silica Coating

An alcohol dispersion solution (A-3) of antimony pentoxide/silica-coated zirconia fine particles having a solid concentration of 10% by weight was prepared in the same manner as in Example A1 except for using 277 g of the antimony pentoxide-coated zirconia sol (A-3).

Surface Treatment

Next, a dispersion solution of the modified zirconia fine particles (A-3) having a solid concentration of 2% by weight was prepared in the same manner as in Example A1 except for using 119 g of an alcohol dispersion solution (A-3) of the antimony pentoxide/silica-coated zirconia fine particles.

For the resulting modified zirconia fine particles (A-3), the average particle size, refractive index, surface potential and dipsersibility were measured, and the results are shown in Table 1.

Example A4

Preparation of Dispersion Solution of Modified Zirconia Fine Particles (A-4)

Preparation of Zirconia Sol (A-2)

A zirconium hydroxide hydrogel ($ZrO_2$ concentration: 1% by weight) was prepared by dissolving 35 g of zirconium oxychloride octahydrate ($ZrOCl_2.8H_2O$) in 1302 g of purified water, and to the resulting solution, 122.8 g of a KOH aqueous solution having a concentration of 10% by weight was added. Subsequently, the zirconium hydroxide hydrogel was precipitated by allowing to stand for 5 hours, and 750 g of a supernatant liquid (PH: 11.0) was removed. Then, 750 g of purified water was added and stirred, and again the resulting solution was left to stand still for 5 hours. The above operations were repeated until the conductivity of the supernatant liquid was 0.5 mS/cm or less.

To the resulting zirconium hydroxide hydrogel, 1.44 g of tartaric acid was added, and the mixture was sufficiently stirred. Subsequently, a KOH aqueous solution having a concentration of 10% by weight was added until the pH was 11.0, and the hydrogel was subjected to dispersion treatment by ultrasonic irradiation for one hour, and then the mixture was washed using an ultrafilter membrane until the conductivity was 0.35 mS/cm or less. Thereafter, 2.6 g of an anion-exchange resin (Duolite UP5000, manufactured by Rohm and Haas Company) was added to remove ions. Subsequently, the resulting zirconium hydroxide hydrogel was filled in an autoclave, and was subject to hydrothermal treatment at 140° C. for 6 hours. The pH at this time was 10.7.

Subsequently, a dispersion solution obtained by the hydrothermal treatment was dried, and the resulting product was sintered at 500° C. for 2 hours to obtain zirconia powders. The resulting zirconia powders were mixed crystals of cubic crystals and monoclinic crystals.

Next, 36 g of the zirconia powder was added to an aqueous solution obtained by dissolving 8.3 g of tartaric acid in 161.9 g of purified water, and the resulting solution was added with 30 g of a KOH aqueous solution having a concentration of 10% by weight to prepare a zirconia powder dispersion solution having a pH of 12.3. The zirconia powder dispersion solution was dispersed with a dispersing machine (BATCH SAND, manufactured by Kansai Paint Co., Ltd.) to prepare a zirconia sol. The resulting zirconia sol was set in a centrifuge and centrifuged at 2500 rpm for 5 minutes, and then washed using an ultrafilter membrane until the conductivity was approximately 100 µS/cm. Subsequently, the resulting zirconia sol was deionized by adding 40 g of an anion-exchange resin (Duolite UP5000), and from the resulting product, a resin was separated to prepare a zirconia sol (A-2) having a $ZrO_2$ concentration of 1% by weight.

The zirconia fine particles observed by a transmission electron microscope (TEM) showed that there were no coarse particles and the like and there were zirconia fine particles having an average particle size of 15 nm. In addition, the zirconia fine particles were mixed crystals of cubic crystals and monoclinic crystals and had a refractive index of 2.0.

Antimony Pentoxide Coating

An aqueous solution was prepared by mixing 210 g of the zirconia sol (A-2) and 90 g of a potassium antimonate aqueous solution (having a concentration of 1% by weight in terms of $Sb_2O_5$) The resulting aqueous solution was passed through an ion exchange column filled with 330 g of a cation-exchange resin (DAIAION PK-216H, manufactured by Mitsubishi Chemical Corporation), and the resulting solution was aged at 90° C. for one hour to prepare an antimony pentoxide-coated zirconia sol (A-4). The resulting sol had a pH of 2.6.

Silica Coating

An alcohol dispersion solution (A-4) of antimony pentoxide/silica-coated zirconia fine particles having a solid concentration of 10% by weight was prepared in the same manner as in Example A1 except for using 277 g of the antimony pentoxide-coated zirconia sol (A-4).

Surface Treatment

Next, a dispersion solution of the modified zirconia fine particles (A-4) having a solid concentration of 2% by weight was prepared in the same manner as in Example A1 except for using 119 g of an alcohol dispersion solution (A-4) of the antimony pentoxide/silica-coated zirconia fine particles.

For the resulting modified zirconia fine particles (A-4), the average particle size, refractive index, surface potential and dipsersibility were measured, and the results are shown in Table 1.

Example A5

Preparation of Dispersion Solution of Modified Zirconia Fine Particles (A-5)

Preparation of Zirconia Sol (A-3)

A zirconium hydroxide hydrogel ($ZrO_2$ concentration: 1% by weight) was prepared by dissolving 35 g of zirconium oxychloride octahydrate ($ZrOCl_2.8H_2O$) in 1302 g of purified water, and to the resulting solution, 122.8 g of a KOH aqueous solution having a concentration of 10% by weight was added. Subsequently, the zirconium hydroxide hydrogel was precipitated by allowing to stand for 5 hours, and 750 g of a supernatant liquid (PH: 11.0) was removed. Then, 750 g of purified water was added and stirred, and again the resulting solution was left to stand still for 5 hours. The above operations were repeated until the conductivity of the supernatant liquid was 0.5 mS/cm or less.

To the resulting zirconium hydroxide hydrogel, 0.64 g of tartaric acid was added, and the mixture was sufficiently stirred. Subsequently, a KOH aqueous solution having a concentration of 10% by weight was added until the pH was 11.0 and the hydrogel was subjected to dispersion treatment by ultrasonic irradiation for one hour, and then the mixture was washed using an ultrafilter membrane until the conductivity was 0.35 mS/cm or less. Thereafter, 2.6 g of an anion-exchange resin (Duolite UP5000, manufactured by Rohm and Haas Company) was added to remove ions. Subsequently, the resulting zirconium hydroxide hydrogel was filled in an autoclave, and was subject to hydrothermal treatment at 200° C. for 6 hours. The pH at this time was 10.7.

Subsequently, a dispersion solution obtained by the hydrothermal treatment was dried, and the resulting product was sintered at 700° C. for 2 hours to obtain zirconia powders. The resulting zirconia powders were mixed crystals of cubic crystals and monoclinic crystals.

Next, 36 g of the zirconia powder was added to an aqueous solution obtained by dissolving 2.2 g of tartaric acid in 161.9 g of purified water, and the resulting solution was added with 30 g of a KOH aqueous solution having a concentration of 10% by weight to prepare a zirconia powder dispersion solution having a pH of 12.3. The zirconia powder dispersion solution was dispersed with a dispersing machine (BATCH SAND, manufactured by Kansai Paint Co., Ltd.) to prepare a zirconia sol. The resulting zirconia sol was set in a centrifuge and centrifuged at 2500 rpm for 5 minutes, and then washed using an ultrafilter membrane until the conductivity was approximately 100 μS/cm. Subsequently, the resulting zirconia sol was deionized by adding 40 g of an anion-exchange resin (Duolite UP5000), and from the resulting product, a resin was separated to prepare a zirconia sol (A-3) having a $ZrO_2$ concentration of 1% by weight.

The zirconia fine particles observed by a transmission electron microscope (TEM) showed that there were no coarse particles and the like and there were zirconia fine particles having an average particle size of 50 nm. In addition, the zirconia fine particles were mixed crystals of cubic crystals and monoclinic crystals and had a refractive index of 2.2.

Antimony Pentoxide Coating

An aqueous solution was prepared by mixing 210 g of the zirconia sol (A-3) and 90 g of a potassium antimonate aqueous solution (having a concentration of 1% by weight in terms of $Sb_2O_5$) The resulting aqueous solution was passed through an ion exchange column filled with 330 g of a cation-exchange resin (DAIAION PK-216H, manufactured by Mitsubishi Chemical Corporation), and the resulting solution was aged at 90° C. for one hour to prepare an antimony pentoxide-coated zirconia sol (A-5). The resulting sol had a pH of 2.6.

Silica Coating

An alcohol dispersion solution (A-5) of antimony pentoxide/silica-coated zirconia fine particles having a solid concentration of 10% by weight was prepared in the same manner as in Example A1 except for using 277 g of the antimony pentoxide-coated zirconia sol (A-5).

Surface Treatment

Next, a dispersion solution of the modified zirconia fine particles (A-5) having a solid concentration of 2% by weight was prepared in the same manner as in Example A1 except for using 119 g of an alcohol dispersion solution (A-5) of the antimony pentoxide/silica-coated zirconia fine particles.

For the resulting modified zirconia fine particles (A-5), the average particle size, refractive index, surface potential and dipsersibility were measured, and the results are shown in Table 1.

Example A6

Preparation of Dispersion Solution of Modified Zirconia Fine Particles (A-6)

Silica Coating

A zirconia sol (A-1) having a $ZrO_2$ concentration of 1.5% by weight was prepared in the same manner as in Example A1. A mixture solution of 100 g of the zirconia sol (A-1), 87.6 g of ethanol and 0.5 g of an ammonia aqueous solution having a concentration of 28% by weight was heated at 35° C., and to the resulting solution, 0.15 g of tetraethoxysilane (Ethylsilicate-A, manufactured by Tama Chemicals Co., Ltd.) was added. Subsequently, the resulting solution was deionized at 80° C. for 3 hours using 602.1 g a cation-exchange resin (DAIAION SK-1BH, manufactured by Mitsubishi Chemical Corporation). The solvent of the resulting zirconia sol was replaced by alcohol using an ultrafilter membrane to prepare an alcohol dispersion solution (A-6) of silica-coated zirconia fine particles having a solid content concentration of 5% by weight.

Surface Treatment

Next, a solution was prepared by adding 0.6 g of γ-methacryloxypropyltrimethoxysilane (KBM-503, manufactured by Shin-Etsu Chemical Co., Ltd.) to 119 g of the alcohol dispersion solution (A-6) of silica-coated zirconia fine particles. The resulting solution was aged at 50° C. for 16 hours to prepare a dispersion solution of modified zirconia fine particles (A-6) having a solid content concentration of 5% by weight.

For the resulting modified zirconia fine particles (A-6), the average particle size, refractive index, surface potential and dipsersibility were measured and the results are shown in Table 1.

Example A7

Preparation of Dispersion Solution of Modified Zirconia Fine Particles (A-7)

Silica Coating

An alcohol dispersion solution (A-7) of silica-coated zirconia fine particles having a solid content concentration of 5% by weight was prepared in the same manner as in Example A6 except for using 0.05 g of tetraethoxysilane (Ethylsilicate-A, manufactured by Tama Chemicals Co., Ltd.).

Surface Treatment

Next, a dispersion solution of modified zirconia fine particles (A-7) having a solid content concentration of 5% by weight was prepared in the same manner as in Example A6 except for using 119 g of the alcohol dispersion solution (A-7) of silica-coated zirconia fine particles.

For the resulting modified zirconia fine particles (A-7), the average particle size, refractive index, surface potential and dipsersibility were measured and the results are shown in Table 1.

Example A8

Preparation of Dispersion Solution of Modified Zirconia Fine Particles (A-8)

Silica Coating

An alcohol dispersion solution (A-8) of silica-coated zirconia fine particles having a solid content concentration of 5% by weight was prepared in the same manner as in Example A6 except for using 0.45 g of tetraethoxysilane (Ethylsilicate-A, manufactured by Tama Chemicals Co., Ltd.).

Surface Treatment

Next, a dispersion solution of modified zirconia fine particles (A-8) having a solid content concentration of 5% by weight was prepared in the same manner as in Example A6 except for using 119 g of the alcohol dispersion solution (A-8) of silica-coated zirconia fine particles.

For the resulting modified zirconia fine particles (A-8), the average particle size, refractive index, surface potential and dipsersibility were measured and the results are shown in Table 1.

Example A9

Preparation of Dispersion Solution of Modified Zirconia Fine Particles (A-9)

Antimony Pentoxide Coating

An aqueous solution was prepared by mixing 210 g of the zirconia sol (A-1) prepared in the same manner as in Example A1 and 90 g of an aqueous solution of potassium antimonate (having a concentration of 1% by weight in terms of $Sb_2O_5$). The resulting aqueous solution was aged at 90° C. for one hour, and then passed through an ion exchange column filled with 330 g of a cation-exchange resin (DAIAION PK-216H, manufactured by Mitsubishi Chemical Corporation) to prepare an antimony pentoxide-coated zirconia sol (A-9) The resulting sol had a pH of 2.6.

Silica Coating

A solution was prepared by adding 1.15 g of tetraethoxysilane (Ethylsilicate-A, manufactured by Tama Chemicals Co., Ltd.) to 277 g of the resulting antimony pentoxide-coated zirconia sol (A-9). To the resulting solution, 277 g of methanol was added, and the resulting solution was aged at 50° C. for 15 hours. Subsequently, the solvent of the resulting solution was replaced by methanol using an ultrafilter membrane to prepare an alcohol dispersion solution (A-9) of antimony pentoxide/silica-coated zirconia fine particles having a solid content concentration of 10% by weight.

Surface Treatment

Next, a solution was prepared by adding 0.18 g of γ-methacryloxypropyltrimethoxysilane (KBM-503, manufactured by Shin-Etsu Chemical Co., Ltd.) to 119 g of the alcohol dispersion solution (A-9) of antimony pentoxide/silica-coated zirconia fine particles. The resulting solution was aged at 50° C. for 15 hours to prepare a dispersion solution of modified zirconia fine particles (A-9) having a solid content concentration of 5% by weight.

For the resulting modified zirconia fine particles (A-9), the average particle size, refractive index, surface potential and dipsersibility were measured and the results are shown in Table 1.

Example A10

Preparation of Dispersion Solution of Modified Zirconia Fine Particles (A-10)

Antimony Pentoxide Coating

An aqueous solution was prepared by mixing 210 g of the zirconia sol (A-1) prepared in the same manner as in Example A1 and 90 g of an aqueous solution of potassium antimonate (having a concentration of 1% by weight in terms of $Sb_2O_5$). The resulting aqueous solution was aged at 90° C. for one hour, and then passed through an ion exchange column filled with 330 g of a cation-exchange resin (DAIAION PK-216H, manufactured by Mitsubishi Chemical Corporation) to prepare a dispersion solution of modified zirconia fine particles (A-10) coated with antimony pentoxide. The resulting sol had a pH of 2.6.

For the resulting modified zirconia fine particles (A-10), the average particle size, refractive index, surface potential and dipsersibility were measured and the results are shown in Table 1.

Comparative Example A1

Preparation of Dispersion Solution of Zirconia Fine Particles (A-R1)

The zirconia sol (A-1) having a $ZrO_2$ concentration of 1% by weight prepared in the same manner as in Example A1 was used as a dispersion solution of zirconia fine particles (A-R1).

For the zirconia particles (A-R1), the average particle size, refractive index, surface potential and dipsersibility were measured and the results are shown in Table 1.

Comparative Example A2

Preparation of Dispersion Solution of Zirconia Fine Particles (A-R2)

The solvent of the zirconia sol (A-1) having a $ZrO_2$ concentration of 1% by weight prepared in the same manner as in Example A1 was replaced by methanol using an ultrafilter membrane to prepared an alcohol dispersion solution (A-R2) of zirconia fine particles having a solid content concentration of 10% by weight.

Surface Treatment

Next, a solution was prepared by adding 0.18 g of γ-methacryloxypropyltrimethoxysilane (KBM-503, manufactured by Shin-Etsu Chemical Co., Ltd.) to 119 g of the alcohol dispersion solution (A-R2) of zirconia fine particles. The resulting solution was aged at 50° C. for 16 hours to prepare a dispersion solution of the surface-treated zirconia fine particles (A-R2) having a solid content concentration of 5% by weight.

For the resulting zirconia particles (A-R2), the average particle size, refractive index, surface potential and dipsersibility were measured and the results are shown in Table 1.

TABLE 1

| | Composition of Modified Zirconia Fine Particles | | | | | | |
|---|---|---|---|---|---|---|---|
| | Zirconia Fine Particles | | | Shell (Coated) Layer | | Surface-treatment Agent | |
| | Average Particle size (nm) | Refractive Index | Content (% by wt) | $Sb_2O_5$ Content (% by wt) | $SiO_2$ Content (% by wt) | Types | Content (% by wt) |
| Example A1 | 30 | 2.1 | 58.9 | 25.2 | 10.1 | γ-methacryloxypropyl trimethoxysilane | 5.8 |
| Example A2 | 30 | 2.1 | 67.3 | 16.8 | 10.1 | γ-methacryloxypropyl trimethoxysilane | 5.8 |
| Example A3 | 30 | 2.1 | 42.0 | 42.0 | 10.1 | γ-methacryloxypropyl trimethoxysilane | 5.8 |
| Example A4 | 15 | 2.0 | 58.9 | 25.2 | 10.1 | γ-methacryloxypropyl trimethoxysilane | 5.8 |
| Example A5 | 50 | 2.2 | 58.9 | 25.2 | 10.1 | γ-methacryloxypropyl trimethoxysilane | 5.8 |
| Example A6 | 30 | 2.1 | 90.0 | — | 2.4 | γ-methacryloxypropyl trimethoxysilane | 7.6 |
| Example A7 | 30 | 2.1 | 91.6 | — | 0.8 | γ-methacryloxypropyl trimethoxysilane | 7.6 |
| Example A8 | 30 | 2.1 | 84.9 | — | 7.5 | γ-methacryloxypropyl trimethoxysilane | 7.6 |
| Example A9 | 30 | 2.1 | 58.9 | 25.2 | 10.1 | γ-methacryloxypropyl trimethoxysilane | 5.8 |
| Example A10 | 30 | 2.1 | 66.0 | 28.1 | — | γ-methacryloxypropyl trimethoxysilane | 5.9 |
| Comparative Example A1 | 30 | 2.1 | 100.0 | — | — | — | — |
| Comparative Example A2 | 30 | 2.1 | 93.0 | — | — | γ-methacryloxypropyl trimethoxysilane | 7 |

| | Surface Potential | | Average Particle size (nm) | Refractive Index | Haze % | Dispersibility |
|---|---|---|---|---|---|---|
| | pH = 3 mV | pH = 10 mV | | | | |
| Example A1 | −33 | −40 | 32 | 1.80 | 0.8 | Excellent |
| Example A2 | −30 | −40 | 31 | 1.85 | 1.2 | Good |
| Example A3 | −35 | −40 | 34 | 1.75 | 0.8 | Excellent |
| Example A4 | −40 | −50 | 16 | 1.75 | 0.9 | Excellent |
| Example A5 | −25 | −35 | 53 | 1.85 | 1.2 | Good |
| Example A6 | −25 | −40 | 32 | 1.90 | 0.9 | Excellent |
| Example A7 | −20 | −40 | 31 | 2.00 | 0.9 | Excellent |
| Example A8 | −30 | −40 | 36 | 1.80 | 0.9 | Excellent |
| Example A9 | −35 | −40 | 32 | 1.80 | 1.0 | Good |
| Example A10 | −30 | −40 | 32 | 1.75 | 1.2 | Good |
| Comparative Example A1 | +20 | −40 | 30 | 2.10 | whitening | Poor |
| Comparative Example A2 | +20 | −40 | 31 | 2.05 | 10.6 | Poor |

Example B1

Preparation of Composite Oxide Particles (B-1)

A solution was prepared by adding 100 g of an potassium antimonate aqueous solution having a concentration of 1% by weight in terms of $Sb_2O_5$ to 90 g of an aqueous dispersion solution of zirconium oxide fine particles (CC-1001ZRV, manufactured by Catalysts & Chemicals Ind. Co., Ltd.; Solid content concentration: 10% by weight, Dispersion medium: water, Average particle size: 20 nm). To the resulting solution, 10 g of a cation-exchange resin (SK1BH, manufactured by Mitsubishi Chemical Corporation) was added to deionize, and the resulting solution was aged at 80° C. for 6 hours, and concentrated using a rotary evaporator to obtain an aqueous dispersion solution of composite oxide fine particles (B-1) (having a solid content concentration of 10% by weight and an average particle size of 20 nm) composed of a core formed from zirconium oxide and a shell formed from antimony pentoxide. The resulting particles had a refractive index of 2.05, as measured by the standard method for refractive index.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-1). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-1) having a solid content concentration of 30% by weight. The average particle size of the surface-treated composite oxide particles (B-1) is shown in Table 2.

Preparation of Coating Solution (B-1) for Forming Hard Coat Film

A resin component (B-1) for forming a hard coat film having a resin concentration of 30% by weight was prepared by diluting an acrylic resin (17-824-9, manufactured by DIC Corporation, Resin concentration: 79.8% by weight, Solvent: butyl acetate) with isopropyl alcohol/methylisobutylketone (1:1).

A coating solution (B-1) for forming a hard coat film was prepared by mixing 100 g of a dispersion solution of the surface-treated composite oxide particles (B-1) with 10 g of the resin component (B-1) for forming a hard coat film.

Production of Substrate (B-1) with Hard Coat Film

The coating solution (B-1) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-1) with a hard coat film. The hard coat film at this time had a thickness of 3 μm.

The resulting hard coat film was measured for a surface resistance value by Hiresta (manufactured by Mitsubishi Chemical corporation), for a total light transmittance and a haze by a haze meter (manufactured by Suga Test Instruments Co., Ltd.), for reflectance by a reflectometer (MCPD3000 manufactured by OTSUKA ELECTRONICS CO., LTD) and for a refractive index by a spectro-ellipsometer (manufactured by SOPRA), and the results are shown in table 3. In addition, the abrasion resistance, pencil hardness and alkali resistance were measured as follows, and the results are shown in Table 3.

Measurement of Abrasion Resistance

Sliding was performed 20 times using #0000 steel wool under a load of 1000 g/cM$^2$ and then the surface of the film was visually observed and evaluated by the following criteria. The results are shown in table 3.

No streaky scratches is observed: Excellent
Slight streaky scratches are observed: Good
Many streaky scratches are observed: Fair
The whole surface is scraped: Poor Measurement of Pencil Hardness The pencil hardness was measured by a pencil hardness tester in accordance with JIS-K-5400.

Evaluation of Alkalinity 0.01 N NaOH aqueous solution was dropped on a transparent coating film of substrate (B-1) with a transparent film, and then wiped off after allowing to stand for 3 minutes. The surface of the film was visually observed by the following criteria, and the results are shown in Table 3.

No droplet trace was observed: Excellent
After breathing upon the film, the droplet trace was observed: Good
The droplet trace was observed: Fair
The whole film surface is peeled off: Poor Example B2

Preparation of Composite Oxide Particles (B-2)

A solution was prepared by adding 100 g of an potassium antimonate aqueous solution having a concentration of 1% by weight in terms of $Sb_2O_5$ to 90 g of an aqueous dispersion solution of zirconium oxide fine particles (CC-1002ZRV, manufactured by Catalysts & Chemicals Ind. Co., Ltd.; Solid content concentration: 10% by weight, Dispersion medium: water, Average particle size: 10 nm). To the resulting solution, 10 g of a cation-exchange resin (SK1BH, manufactured by Mitsubishi Chemical Corporation) was added to deionize, and the resulting solution was aged at 80° C. for 6 hours, and concentrated using a rotary evaporator to obtain an aqueous dispersion solution of composite oxide fine particles (B-2) (having a solid content concentration of 10% by weight and an average particle size of 13 nm) composed of a core formed from zirconium oxide and a shell formed from antimony pentoxide. The resulting particle had a refractive index of 2.05.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-2). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-2) having a solid content concentration of 30% by weight. The average particle size of the surface-treated composite oxide particles (B-2) is shown in Table 2.

Preparation of Coating Solution (B-2) for Forming Hard Coat Film

A coating solution (B-2) for forming a hard coat film was prepared by mixing 10 g of a dispersion solution of the surface-treated composite oxide particles (B-2) with 10 g of the resin component (B-1) for forming a hard coat film prepared in the same manner as in Example B1.

Production of Substrate (B-2) with Hard Coat Film

The coating solution (B-2) for forming a hard coat film was applied on a PET film (Cosmoshine A4100, manufactured by Toyobo Co., Ltd., Thickness: 188 μm, Refractive index: 1.67, Substrate haze: 0.8%) by a bar boater method (#10) and dried at 80° C. for 120 seconds, and then cured by irradiation with ultraviolet rays with a dose of 600 mJ/cm$^2$ to produce a substrate (B-2) with a hard coat film. The hard coat film at this time had a thickness of 3 μm.

For the resulting substrate (b-2) with a hard coat film, the surface resistance value, total light transmittance, haze, reflectance, abrasion resistance, pencil hardness and alkali resistance were measured, and the results are shown in Table 3.

Example B3

Preparation of Composite Oxide Particles (B-3)

A solution was prepared by adding 200 g of an potassium antimonate aqueous solution having a concentration of 1% by weight in terms of $Sb_2O_5$ to 80 g of an aqueous dispersion solution of zirconium oxide fine particles (CC-1003ZRV, manufactured by Catalysts & Chemicals Ind. Co., Ltd.; Solid content concentration: 10% by weight, Dispersion medium: water, Average particle size: 50 nm). To the solution, 10 g of a cation-exchange resin (SK1BH, manufactured by Mitsubishi Chemical Corporation) was added to deionize, and the resulting solution was aged at 80° C. for 6 hours, and concentrated using a rotary evaporator to obtain an aqueous dispersion solution of composite oxide fine particles (B-3) (having a solid content concentration of 10% by weight and an average particle size of 52 nm) composed of a core formed from zirconium oxide and a shell formed from antimony pentoxide. The resulting particle had a refractive index of 2.05.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-3). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-3) having a solid content concentration of 30% by weight. The average particle size of the surface-treated composite oxide particles (B-3) is shown in Table 2.

Preparation of Coating Solution (B-3) for Forming Hard Coat Film

A coating solution (B-3) for forming a hard coat film was prepared by mixing 10 g of a dispersion solution of the surface-treated composite oxide particles (B-3) with 10 g of the resin component (B-1) for forming a hard coat film prepared in the same manner as in Example B1.

Production of Substrate (B-3) with Hard Coat Film

The coating solution (B-3) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm² to produce a substrate (B-3) with a hard coat film. The hard coat film at this time had a thickness of 3 μm.

For the resulting substrate (B-3) with a hard coat film, the surface resistance valuer total light transmittance, haze, reflectance, abrasion resistance, pencil hardness and alkali resistance were measured, and the results are shown in Table 3.

Example B4

Preparation of Composite Oxide Particles (B-4)

A solution was prepared by adding 50 g of an potassium antimonate aqueous solution having a concentration of 1% by weight in terms of $Sb_2O_5$ to 95 g of an aqueous dispersion solution of zirconium oxide fine particles (CC-1001ZRV, manufactured by Catalysts & Chemicals Ind. Co., Ltd.; Solid content concentration: 10% by weight, Dispersion medium: water, Average particle size: 20 nm). To the resulting solution, 10 g of a cation-exchange resin (SK1BH, manufactured by Mitsubishi Chemical Corporation) was added to deionize, and the resulting solution was aged at 80° C. for 6 hours, and concentrated using a rotary evaporator to obtain an aqueous dispersion solution of composite oxide fine particles (B-4) (having a solid content concentration of 10% by weight and an average particle size of 21 nm) composed of a core formed from zirconium oxide and a shell formed from antimony pentoxide. The resulting particles had a refractive index of 2.06.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-4). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-4) having a solid content concentration of 30% by weight. The average particle size of the surface-treated composite oxide particles (B-4) is shown in Table 2.

Preparation of Coating Solution (B-4) for Forming Hard Coat Film

A coating solution (B-4) for forming a hard coat film was prepared by mixing 10 g of a dispersion solution of the surface-treated composite oxide particles (B-4) with 10 g of the resin component (B-1) for forming a hard coat film prepared in the same manner as in Example B1.

Production of Substrate (B-4) with Hard Coat Film

The coating solution (B-4) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm² to produce a substrate (B-4) with a hard coat film. The hard coat at this time had a thickness of 3 μm.

For the resulting substrate (B-4) with a hard coat film, the surface resistance value, total light transmittance, haze, reflectance, abrasion resistance, pencil hardness and alkali resistance were measured, and the results are shown in Table 3.

Example B5

Preparation of Composite Oxide Particles (B-5)

A solution was prepared by adding 400 g of an potassium antimonate aqueous solution having a concentration of 1% by weight in terms of $Sb_2O_5$ to 60 g of an aqueous dispersion solution of zirconium oxide fine particles (CC-1001ZRV, manufactured by Catalysts & Chemicals Ind. Co., Ltd.; Solid content concentration: 10% by weight, Dispersion medium: water, Average particle size: 20 nm) To the resulting solution, 10 g of a cation-exchange resin (SK1BH, manufactured by Mitsubishi Chemical Corporation) was added to deionize, and the resulting solution was aged at 80° C. for 6 hours, and concentrated using a rotary evaporator to obtain an aqueous dispersion solution of composite oxide fine particles (B-5) (having a solid content concentration of 10% by weight and an average particle size of 25 nm) composed of a core formed from zirconium oxide and a shell formed from antimony pentoxide. The resulting particles had a refractive index of 2.03.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-5). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-5) having a solid content concentration of 30% by weight. The average particle size of the surface-treated composite oxide particles (B-5) is shown in Table 2.

Preparation of Coating Solution (B-5) for Forming Hard Coat Film

A coating solution (B-5) for forming a hard coat film was prepared by mixing 12 g of a dispersion solution of the surface-treated composite oxide particles (B-5) with 8 g of the resin component (B-1) for forming a hard coat film prepared in the same manner as in Example B1.

Production of Substrate (B-5) with Hard Coat Film

The coating solution (B-5) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-5) with a hard coat film. The hard coat film at this time had a thickness of 3 μm.

For the resulting substrate (B-5) with a hard coat film, the surface resistance value, total light transmittance, haze, reflectance, abrasion resistance, pencil hardness and alkali resistance were measured, and the results are shown in Table 3.

Example B6

Preparation of Composite Oxide Particles (B-6)

A solution was prepared by adding 110 g of No. 3 liquid glass having a concentration of 1% by weight in terms of $SiO_2$ to 90 g of an aqueous dispersion solution of zirconium oxide fine particles (CC-1001ZRV, manufactured by Catalysts & Chemicals Ind. Co., Ltd.; Solid content concentration: 10% by weight, Dispersion medium: water, Average particle size: 20 nm). To the resulting solution, 10 g of a cation-exchange resin (SK1BH, manufactured by Mitsubishi Chemical Corporation) was added to deionize, and the resulting solution was aged at 90° C. for 6 hours, and concentrated using a rotary evaporator to obtain an aqueous dispersion solution of composite oxide fine particles (B-6) (having a solid content concentration of 10% by weight and an average particle size of 20 nm) composed of a core formed from zirconium oxide and a shell formed from antimony pentoxide. The resulting particle had a refractive index of 1.95.

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of the resulting aqueous dispersion solution of composite oxide fine particles (B-6). The resulting solution was aged at 60° C. for 5 hours. Thereafter, the solvent of the solution was replaced by 2-propanol using an ultrafilter membrane made of ceramics to prepare a 2-propanol dispersion solution of surface-treated composite oxide particles (B-6) having a solid content concentration of 30% by weight. The average particle size of the surface-treated composite oxide particles (B-6) is shown in Table 2.

Preparation of Coating Solution (B-6) for Forming Hard Coat Film

A coating solution (B-6) for forming a hard coat film was prepared by mixing 12 g of a dispersion solution of the surface-treated composite oxide particles (B-6) with 8 g of the resin component (B-1) for forming a hard coat film prepared in the same manner as in Example B1.

Production of Substrate (B-6) with Hard Coat Film

The coating solution (B-6) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-6) with a hard coat film. The hard coat film at this time had a thickness of 3 μm.

For the resulting substrate (B-6) with a hard coat film, the surface resistance value, total light transmittance, haze, reflectance, abrasion resistance, pencil hardness and alkali resistance were measured, and the results are shown in Table 3.

Example B7

Preparation of Composite Oxide Particles (B-7)

A solution was prepared by adding 10 g of tetraethoxysilane (manufactured by Tama Chemicals Co., Ltd., a concentration of 28.8% by weight in terms of $SiO_2$) to 100 g of an aqueous dispersion solution of the composite oxide particles (B-1) prepared in the same manner as in Example B1, and the resulting solution was added with 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight. The resulting solution was aged at 60° C. for 5 hours. The obtained particles had a refractive index of 1.85. Thereafter, the solvent of the solution was replaced by 2-propanol using an ultrafilter membrane made of ceramics to prepare a 2-propanol dispersion solution of surface-treated composite oxide particles (B-7) having a solid content concentration of 30% by weight. The average particle size of the surface-treated composite oxide particles (B-7) is shown in Table 2.

Preparation of Coating Solution (B-7) for Forming Hard Coat Film

A coating solution (B-7) for forming a hard coat film was prepared by mixing 14 g of a dispersion solution of the surface-treated composite oxide particles (B-7) with 6 g of the resin component (B-1) for forming a hard coat film prepared in the same manner as in Example B1.

Production of Substrate (B-7) with Hard Coat Film

The coating solution (B-7) for forming a hard coat film was applied on a PET film (Cosmoshine A4100, manufactured by Toyobo Co., Ltd., Thickness: 188 μm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-7) with a hard coat film. The hard coat film at this time had a thickness of 3 μm.

For the resulting substrate (B-7) with a hard coat film, the surface resistance value, total light transmittance, haze, reflectance, abrasion resistance, pencil hardness and alkali resistance were measured, and the results are shown in Table 3.

Example B8

Preparation of Coating Solution (B-8) for Forming Hard Coat Film

A coating solution (B-8) for forming a hard coat film was prepared by mixing 10 g of a dispersion solution of the surface treated composite oxide particles (B-7) prepared in the same manner as in Example B7 and 4 g of a 2-propanol dispersion solution of antimony pentoxide fine particles (ELCOM V-4521, manufactured by Catalysts & Chemicals Ind. Co., Ltd.; Solid content concentration: 30% by weight, Average particle size: 20 nm) with 6 g of the resin component (B-1) for forming a hard coat film prepared in the same manner as in Example B1.

Production of Substrate (B-8) with Hard Coat Film

The coating solution (B-8) for forming a hard coat film was applied on a PET film (Cosmoshine A4100, manufactured by Toyobo Co., Ltd., Thickness: 188 µm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-8) with a hard coat film. The hard coat film at this time had a thickness of 3 µm.

For the resulting substrate (B-8) with a hard coat film, the surface resistance value, total light transmittance haze, reflectance, abrasion resistance, pencil hardness and alkali resistance were measured, and the results are shown in Table 3.

Example B9

Preparation of Coating Solution (B-9) for Forming Hard Coat Film

A coating solution (B-9) for forming a hard coat film was prepared by mixing 10 g of a dispersion solution of the surface treated composite oxide particles (B-7) prepared in the same manner as in Example B7 and 4 g of an ethanol dispersion solution of antimony-doped tin oxide particles (ELCOM V-3501, manufactured by Catalysts & Chemicals Ind. Co., Ltd.; Solid content concentration: 20% by weight, Average particle size: 8 nm) with 6 g of the resin component (B-1) for forming a hard coat film prepared in the same manner as in Example B1.

Production of Substrate (B-9) with Hard Coat Film

The coating solution (B-9) for forming a hard coat film was applied on a PET film (Cosmoshine A4100, manufactured by Toyobo Co., Ltd., Thickness: 188 µm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-9) with a hard coat film. The hard coat film at this time had a thickness of 3 µm.

For the resulting substrate (B-9) with a hard coat film, the surface resistance value, total light transmittance, haze, reflectance, abrasion resistance, pencil hardness and alkali resistance were measured, and the results are shown in Table 3.

Example B10

Production of Substrate (B-10) with Antireflection Film and Hard Coat Film

On the substrate (B-9) with a hard coat film produced in the same manner as in Example B9, was coated a paint for forming an antireflection film (ELCOM P-5013, manufactured by Catalysts & Chemicals Ind. Co., Ltd.; acrylic resin: Solid content concentration of 1% by weight; hollow silica fine particles: Average particle size of 50 nm, Solid content concentration of 1.5% by weight, Dispersion medium: 2-propanol, methylisobutylketone, isopropylglycol, butylcellosolve) by a bar coater method (#4) was coated. The paint was dried at 80° C. for 120 seconds, and then cured by irradiation with ultraviolet rays with a dose of 600 mJ/cm$^2$ to produce a substrate (B-10) with an antireflection film and a hard coat film. The antireflection film at this time had a thickness of 0.1 µm.

For the resulting substrate (B-10) with an antireflection film and a hard coat film, the surface resistance value, total light transmittance, haze, reflectance, abrasion resistance, pencil hardness and alkali resistance were measured, and the results are shown in Table 3.

Comparative Example B1

Preparation of Surface-Treated Zirconium Oxide Particles (B-R1)

A solution was prepared by adding 5 g of γ-methacryloxypropyltrimethoxysilane (KBM-503, manufactured by Shin-Etsu Chemical Co., Ltd., a concentration of 81.2% by weight), 100 g of methanol and 1 g of ammonia water having a concentration of 29.8% by weight to 100 g of an aqueous dispersion solution of zirconium oxide fine particles (CC-1001ZRV, manufactured by Catalysts & Chemicals Ind. Co., Ltd.; Solid content concentration: 10% by weight, Dispersion medium: water, Average particle size: 20 nm). The resulting solution was aged at 60° C. for 5 hours. Thereafter, the solvent of the solution was replaced by 2-propanol using an ultrafilter membrane made of ceramics to prepare a 2-propanol dispersion solution of surface-treated zirconium oxide particles (B-R1) having a solid content concentration of 30% by weight. The resulting particles had a refractive index of 2.06.

Preparation of Coating Solution (B-R1) for Forming Hard Coat Film

A coating solution (B-R1) for forming a hard coat film was prepared by mixing 10 g of a dispersion solution of the surface-treated zirconium oxide particles (B-R1) with 10 g of the resin component (B-1) for forming hard coat film prepared in the same manner as in Example B1.

Production of Substrate (B-R1) with Hard Coat Film

The coating solution (B-R1) for forming a hard coat film was applied on a PET film (Cosmoshine A4100, manufactured by Toyobo Co., Ltd., Thickness: 188 µm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-R1) with a hard coat film. The hard coat film at this time had a thickness of 3 µm.

For the resulting substrate (B-R1) with a hard coat film, the surface resistance value, total light transmittance, haze, reflectance, abrasion resistance, pencil hardness and alkali resistance were measured, and the results are shown in Table 3.

Comparative Example B2

Preparation of Coating Solution (B-R2) for Forming Hard Coat Film

A coating solution (B-R2) for forming a hard coat film was prepared by mixing 8 g of a 2-propanol dispersion solution of the surface treated zirconium oxide particles (B-R1) prepared in the same manner as in Comparative Example B1 and 2 g of a 2-propanol dispersion solution of antimony pentoxide fine particles (ELCOM V-4521, manufactured by Catalysts & Chemicals Ind. Co., Ltd.; Solid content concentration: 30% by weight, Average particle size: 20 nm) with 10 g of the resin component (B-1) for forming a hard coat film prepared in the same manner as in Example B1.

Production of Substrate (B-R2) with Hard Coat Film

The coating solution (B-R2) for forming a hard coat film was applied on a PET film (Cosmoshine A4100, manufactured by Toyobo Co., Ltd., Thickness: 188 µm, Refractive index: 1.67, Substrate haze: 0.8%) by a bar coater method (#10) and dried at 80° C. for 120 seconds, and then cured by irradiation with ultraviolet rays with a dose of 600 mJ/cm$^2$ to produce a substrate (B-R2) with a hard coat film. The hard coat film at this time had a thickness of 3 μm.

For the resulting substrate (B-R2) with a hard coat film, the surface resistance value, total light transmittance, haze, reflectance, abrasion resistance, pencil hardness and alkali resistance were measured, and the results are shown in Table 3.

TABLE 3

| | Substrate with Hard Coat Film | | | | | | |
|---|---|---|---|---|---|---|---|
| | Substrate | | | | | | |
| | Type | Refractive Index | Difference in Refractive Index with hard Coat Film | Hard Coat Film Thickness (μm) | Antireflection Film Thickness (μm) | Surface Resistance (Ω/sq) | Transmittance (%) |
| Example B1 | PET | 1.67 | 0.0 | 3 | — | 3E+13 | 88.2 |
| Example B2 | PET | 1.67 | 0.0 | 3 | — | 9E+12 | 88.2 |
| Example B3 | PET | 1.67 | 0.0 | 3 | — | 8E+14 | 88.3 |
| Example B4 | PET | 1.67 | 0.0 | 3 | — | 7E+14 | 88.1 |
| Example B5 | PET | 1.67 | 0.0 | 3 | — | 3E+10 | 88.3 |
| Example B6 | PET | 1.67 | 0.0 | 3 | — | 1E+14< | 88.3 |
| Example B7 | PET | 1.67 | 0.0 | 3 | — | 8E+13 | 88.1 |
| Example B8 | PET | 1.67 | 0.0 | 3 | — | 5E+10 | 88.3 |
| Example B9 | PET | 1.67 | 0.0 | 3 | — | 8E+09 | 85.5 |
| Example B10 | PET | 1.67 | 0.0 | 3 | 0.1 | 9E+09 | 90.2 |
| Comparative Example B1 | PET | 1.67 | 0.01 | 3 | — | 1E+14< | 86.3 |
| Comparative Example B2 | PET | 1.67 | 0.0 | 3 | — | 8E+13 | 85.5 |

| | Substrate with Hard Coat Film | | | | | |
|---|---|---|---|---|---|---|
| | Haze (%) | Reflectance (%) | Refractive Index | Abrasion Resistance | Pencil Hardness | Alkali Resistance |
| Example B1 | 0.8 | 6.5 | 1.67 | Good | 3H | Excellent |
| Example B2 | 0.8 | 6.5 | 1.67 | Good | 3H | Excellent |
| Example B3 | 0.8 | 6.5 | 1.67 | Good | 3H | Excellent |
| Example B4 | 0.8 | 6.5 | 1.67 | Good | 3H | Excellent |
| Example B5 | 0.8 | 6.5 | 1.67 | Good | 3H | Excellent |
| Example B6 | 0.8 | 6.5 | 1.67 | Good | 3H | Excellent |
| Example B7 | 0.8 | 6.5 | 1.67 | Excellent | 4H | Excellent |
| Example B8 | 0.8 | 6.5 | 1.67 | Excellent | 4H | Excellent |
| Example B9 | 0.8 | 6.5 | 1.67 | Excellent | 4H | Excellent |
| Example B10 | 0.8 | 1.1 | 1.40 | Excellent | 4H | Excellent |
| Comparative Example B1 | 1.3 | 6.1 | 1.68 | Poor | H | Poor |
| Comparative Example B2 | 3.1 | 3.5 | 1.67 | Poor | H | Poor |

The E is a power of ten, for example, 3E+10 represents $3 \times 10^{10}$.

TABLE 2

| | ZrO$_2$ Core Particles | | Shell Layer | | Surface Treatment | | | | |
|---|---|---|---|---|---|---|---|---|---|
| | | | | | First Stage | | | Second stage | |
| | Average Particle Size | Composition Ratio (% by wt) | Kinds | Composition Ratio (% by wt) | Types | Treating Amount (% by wt) | Types | | Treating Amount (% by wt) |
| Example B1 | 20 | 90 | Sb$_2$O$_5$ | 10 | γ-methacryloxypropyltrimethoxysilane | 29 | — | | — |
| Example B2 | 10 | 90 | Sb$_2$O$_5$ | 10 | γ-methacryloxypropyltrimethoxysilane | 29 | — | | — |
| Example B3 | 50 | 80 | Sb$_2$O$_5$ | 20 | γ-methacryloxypropyltrimethoxysilane | 29 | — | | — |
| Example B4 | 20 | 95 | Sb$_2$O$_5$ | 5 | γ-methacryloxypropyltrimethoxysilane | 29 | — | | — |
| Example B5 | 20 | 60 | Sb$_2$O$_5$ | 40 | γ-methacryloxypropyltrimethoxysilane | 29 | — | | — |
| Example B6 | 20 | 90 | SiO$_2$ | 10 | γ-methacryloxypropyltrimethoxysilane | 29 | — | | — |

TABLE 2-continued

| | | | | | | | | |
|---|---|---|---|---|---|---|---|---|
| Example B7 | 20 | 90 | Sb₂O₅ | 10 | Tetraethoxysilane | 22 | γ-methacryloxypropyltrimethoxysilane | 24 |
| Example B8 | 20 | 90 | Sb₂O₅ | 10 | Tetraethoxysilane | 22 | γ-methacryloxypropyltrimethoxysilane | 24 |
| Example B9 | 20 | 90 | Sb₂O₅ | 10 | Tetraethoxysilane | 22 | γ-methacryloxypropyltrimethoxysilane | 24 |
| Example B10 | 20 | 90 | Sb₂O₅ | 10 | Tetraethoxysilane | 22 | γ-methacryloxypropyltrimethoxysilane | 24 |
| Co-Example B1 | 20 | 100 | — | — | γ-methacryloxypropyoxysilane | 29 | — | — |
| Co-Example B2 | 20 | 100 | — | — | γ-methacryloxypropyltrimethoxysilane | 29 | — | — |

| | | | Hard Coat Film-Forming Material | | | | | |
|---|---|---|---|---|---|---|---|---|
| | Average Particle size (nm) | Particle Refractive Index | Total Content Concentration (% by wt) | Composite Oxide Particles Concentration (% by wt) | Other Particles Kinds | Particle Size (nm) | Concentration (% by wt) | Matrix Component Kinds | Concentration (% by wt) |
| Example B1 | 22 | 2.05 | 30 | 15 | — | — | — | Acrylic | 15 |
| Example B2 | 13 | 2.05 | 30 | 15 | — | — | — | Acrylic | 15 |
| Example B3 | 55 | 2.05 | 30 | 15 | — | — | — | Acrylic | 15 |
| Example B4 | 21 | 2.06 | 30 | 15 | — | — | — | Acrylic | 15 |
| Example B5 | 25 | 2.03 | 30 | 15 | — | — | — | Acrylic | 15 |
| Example B6 | 22 | 1.95 | 30 | 12 | — | — | — | Acrylic | 18 |
| Example B7 | 22 | 1.85 | 30 | 21 | — | — | — | Acrylic | 9 |
| Example B8 | 22 | 1.85 | 30 | 15 | Sb₂O₅ | 20 | 6 | Acrylic | 9 |
| Example B9 | 22 | 1.85 | 28 | 15 | ATO | 8 | 4 | Acrylic | 9 |
| Example B10 | 22 | 1.85 | 28 | 15 | ATO | 8 | 4 | Acrylic | 9 |
| Co-Example B1 | 20 | 2.06 | 30 | 12 | — | 20 | 3 | Acrylic | 18 |
| Co-Example B2 | 20 | 2.06 | 30 | 12 | Sb₂O₅ | 20 | 3 | Acrylic | 15 |

What is claimed is:

1. A coating solution for forming a hard coat film comprising composite oxide particles and a matrix-forming component, the composite oxide particles being composite oxide particles having a core-shell structure composed of a core formed from zirconium oxide and a shell formed from antimony pentoxide and/or silica, wherein the composite oxide particles are surface-treated with an organic silicon compound represented by the following formula (1-2) in advance and then an organic silicon compound represented by the following formula (1-1):

$$R^1(X')_m—Si(OR^2)_3 \quad (1\text{-}1),$$

where $R^1$ represents an organic group having 1 to 10 carbon atoms derived from a substituted or unsubstituted hydrocarbon, X' represents one or more kinds of functional groups selected from a (meth)acryloyl group, an epoxy group (a glycide group), an urethane group, an amino group and a fluoro group, m is an integer of 1 or more, and $R^2$ represents an organic group having 1 to 10 carbon atoms derived from a substituted or unsubstituted hydrocarbon;

$$Si(OR^3)_4 \quad (1\text{-}2),$$

where $R^3$ represents a hydrogen atom, a halogen atom, or an organic group having 1 to 10 carbon atoms derived from a substituted or unsubstituted hydrocarbon groups, wherein the shell in the composite oxide particles is present in a range of 1 to 70% by weight relative to the oxide amount, wherein the organic silicon compound represented by the formula (1-2) includes one or more of tetramethoxysilane, tetraethoxysilane, tetrapropoxysilane, tetrabutoxysilane, wherein the organic silicon compound represented by the formula (1-1) includes one or more of 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltriethoxysilane, γ-(β-glycidoxyethoxy)propyltrimethoxysilane, γ-(meth)

acryloxymethyltrimethoxysilane, acryloxymethyltriethoxysilane, acryloxyethyltrimethoxysilane, acryloxyethyltriethoxysilane, acryloxypropyltrimethoxysilane, acryloxypropyltrimethoxysilane, acryloxypropyltriethoxysilane, γ-(meth)acryloxymethyltrimethoxysilane, γ-(meth)acryloxymethyltriethoxysilane, γ-(meth)acryloxyethyltrimethoxysilane, γ-(meth)acryloxyethyltriethoxysilane, γ-(meth)acryloxypropyltrimethoxysilane, γ-(meth)acryloxypropyltrimethoxysilane, γ-(meth)acryloxypropyltriethoxysilane, 3-ureidopropyltriethoxysilane, perfluorooctylethyltrimethoxysilane, perfluorooctylethyltriethoxysilane, perfluorooctylethyltriisopropoxysilane, trifluoropropyltrimethoxysilane, N-β(aminoethyl)γ-aminopropylmethyldimethoxysilane, N-β(aminoethyl)γ-aminopropyltrimethoxysilane, and N-phenyl-γ-aminopropyltrimethoxysilane, and wherein the treating amount of the organic silicon compound (1-1) is 1 to 50% by weight, on basis that the organic silicon compound (1-1) in the resulting surface-treated composite oxide particles is $X-R-SiO_{3/2}$, and the treating amount of the organic silicon compound (1-2) is 1 to 70% by weight, on basis that the organic silicon compound in the resulting surface-treated composite oxide particles is $SiO_2$.

2. The coating solution for forming a hard coat film according to claim 1, wherein the composite oxide particles have an average particle size in a range of 5 to 120 nm and a refractive index ($P_n$) in a range of 1.50 to 2.10.

3. The coating solution for forming a hard coat film according to claim 1, wherein the outermost layer of the composite oxide particles is antimony pentoxide.

4. The coating solution for forming a hard coat film according to claim 1, wherein the matrix component is composed of a silicon resin and/or an organic resin.

* * * * *